(12) United States Patent
Müller et al.

(10) Patent No.: US 7,211,239 B2
(45) Date of Patent: May 1, 2007

(54) PROCESS FOR PREPARING A NANOSIZED ZEOLITIC MATERIAL

(75) Inventors: Ulrich Müller, Neustadt (DE); Lian Ma, Shanghai (CN); Xiao Feng-Shou, Changchun (CN); Xiaoyu Yang, Changchun (CN)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/111,871

(22) Filed: Apr. 22, 2005

(65) Prior Publication Data

US 2006/0239906 A1    Oct. 26, 2006

(51) Int. Cl.
    *C01B 39/02*   (2006.01)
(52) U.S. Cl. ............... 423/702; 423/716; 423/DIG. 22; 423/DIG. 27
(58) Field of Classification Search ................ 423/702, 423/716, DIG. 22, DIG. 27
    See application file for complete search history.

(56) References Cited

U.S. PATENT DOCUMENTS

| 4,061,717 | A | * | 12/1977 | Kerr et al. ................. 423/702 |
| 5,863,516 | A | * | 1/1999 | Otterstedt et al. .......... 423/700 |
| 6,096,469 | A | | 8/2000 | Anderson et al. |
| 2002/0098147 | A1 | * | 7/2002 | Huo ........................... 423/700 |
| 2002/0183407 | A1 | * | 12/2002 | Yoon et al. .................... 521/50 |
| 2003/0105248 | A1 | * | 6/2003 | Cao et al. ..................... 526/72 |
| 2004/0014591 | A1 | | 1/2004 | Muller et al. |

FOREIGN PATENT DOCUMENTS

| CA | 2 346 892 | | 4/2000 |
| DE | 198 47 630 A1 | | 4/2000 |
| EP | 1 195 368 A2 | | 4/2002 |
| EP | 1 331 032 A2 | | 7/2003 |
| JP | 05017124 A | * | 1/1993 |
| WO | WO 99/21796 | | 5/1999 |
| WO | WO 03/064322 A1 | | 8/2003 |

OTHER PUBLICATIONS

B. J. Schoeman, et al., "Colloidal zeolite suspensions", ZEOLITES, vol. 14, 1994, pp. 110-116.
A. E. Persson, et al., "The synthesis of discrete colloidal particles of TPA-silicalite-1", ZEOLITES, vol. 14, Sep./Oct. 1994, pp. 557-567.
R. W. Corkery, et al., "Low-temperature synthesis and characterization of a stable colloidal TPA-silicalite-1 suspension", ZEOLITES, vol. 18, 1997, pp. 379-386.
Masami Yamamura, et al., "Synthesis of ZSM-5 zeolite with small crystal size and its catalytic performance for ethylene oligomerization", ZEOLITES, vol. 14, Nov./Dec. 1994, pp. 643-649.
Xianping MENG, et al., "Synthesis of Ultrafine Zeolite L", Proceedings of the 9th International Zeolite Conference, Montreal 1992, pp. 297-304.
Guangshan Zhu, et al., "Synthesis and Characterization of High-Quality Zeolite LTA and FAU Single Nanocrystals", Chem. Mater., vol. 10, No. 6, 1998, pp. 1483-1486.
K. Rajagopalan, et al., "Influence of Zeolite Particle Size on Selectivity During Fluid Catalytic Cracking", Applied Catalysis, vol. 23, 1986, pp. 69-80.
M. A. Camblor, et al., "Catalytic Cracking of Gasoil, Benefits in Activity and Selectivity of Small Y Zeolite Crystallites Stabilized by a Higher Silicon-to-Aluminium Ratio by Synthesis", Applied Catalysis, vol. 55, 1989, pp. 65-74.
Iver Schmidt, et al., "Confined Space Synthesis. A Novel Route to Nanosized Zeolites", Inorganic Chemistry, vol. 39, No. 11, 2000, pp. 2279-2283.
Xiaoyu Yang, et al., "Synthesis of Uniformed Nanosized Zeolites from Reaction Gels inside Confined Polymer Spherodial Voids", 14th International Zeolite Conference, South Africa, Apr. 23-25, 2004, 2 pages.
Holland, et al., "Synthesis of Highly Ordered, Three-Dimensional, Macroporous Structures of Amorphous or Crystalline Inorganic Oxides, Phosphates, and Hybrid Composites", XP-002243527, Chem. Mater, vol. 11, pp. 795-805 (1999).
Danumah, et al., "Synthesis of macrostructured MCM-48 molecular sieves", Microporous and Mesoporous Materials, vol. 44-45, pp. 241-247 (2001).
Stein, "Sphere templating methods for periodic porous solids", Microporous and Mesoporous Materials, vol. 44-45, pp. 227-239 (2001).

* cited by examiner

*Primary Examiner*—David Sample
(74) *Attorney, Agent, or Firm*—Oblon, Spivak, McClelland, Maier & Neustadt, P.C.

(57) ABSTRACT

A process for preparing a zeolitic material, comprising
(i) preparing a mixture comprising the at least one silicon containing precursor compound from which the zeolitic framework is formed, at least one pore forming agent, and at least one polymer which has an essentially spheroidal geometry in the mixture;
(ii) crystallizing the zeolitic material from the mixture obtained in (i) to obtain the crystallized zeolitic material in its mother liquor.

14 Claims, 9 Drawing Sheets

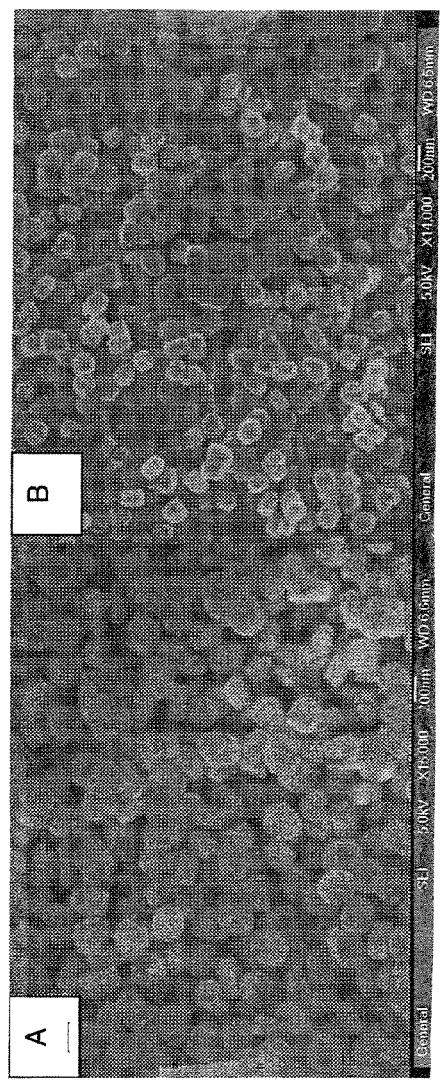
FIG. 9A
FIG. 9B
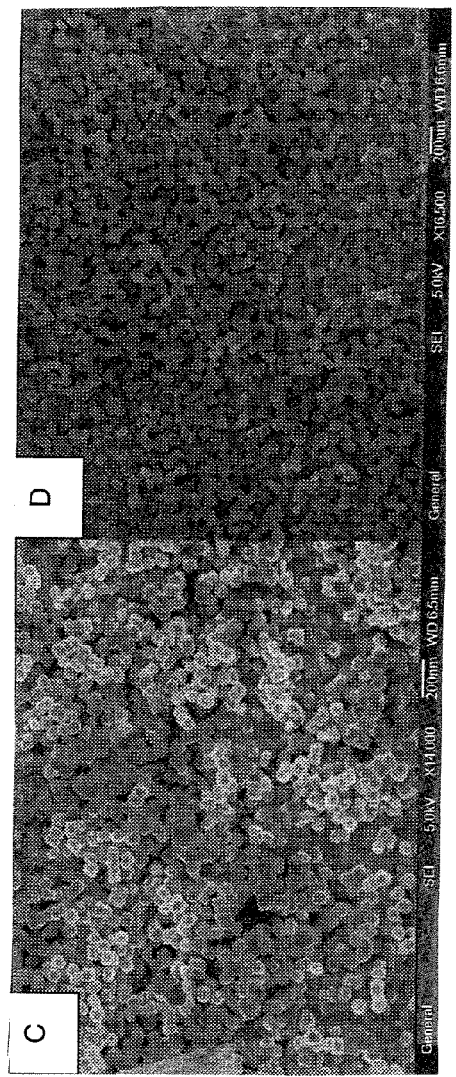
FIG. 9C
FIG. 9D

PROCESS FOR PREPARING A NANOSIZED ZEOLITIC MATERIAL

FIELD OF THE INVENTION

The present invention provides a process for preparing a zeolitic material with a narrow crystal size distribution. The process comprises the crystallisation of the zeolitic material in the presence of a suitable polymer which has an essentially spheroidal geometry in the mixture from which the zeolite crystals are obtained.

BACKGROUND OF THE INVENTION

Uniformed nanosized zeolites are important in many technical areas such as catalysis. Therefore, some examples are reported relating to the synthesis of these zeolites.

EP 1 195 368 A2 describes a process for the catalytic selective oxidation of a hydrocarbon compound in the presence of a mesoporous zeolite. As zeolite, a titanium containing zeolite, in particular a zeolite TS-1 is disclosed. It is described that, contrary to nanosized TS-1, separation of mesoporous TS-1 was found to be easily accomplished by simple filtration. The mesoporous zeolite is prepared by crystallisation in a mesoporous solid-state carbon matrix followed by removal of the matrix by combustion. This process necessarily leads to relatively large crystals, i.e. crystals having a size in the range from about 0.3 to 1.2 micrometer. Thus, crystals having a broad size distribution were obtained.

EP 1 331 032 A2 describes a process for preparing a catalytic material prepared by an immobilisation process in a non-crystallographic mesopore system, wherein mesoporosity is primarily introduced into the individual zeolite single crystal during crystallisation. Thus, a solid-state matrix is used for preparing the catalyst which does not allow for an easy change of the size of the crystals by varying a simple parameter of the process.

In "Colloidal Zeolite Suspensions", Zeolites Vol 14 (1994) pages 110 to 116B. J. Schoeman et al, describe a process for producing discrete zeolite particles with an average particle size of less than 150 nm and a narrow particle size distribution. Key parameter of this process is the addition of sodium in the crystallisation process. Thus, this method is limited to zeolites which contain sodium or, in case the zeolite shall be used in a technical area where sodium is disadvantageous, the sodium has to be removed, if possible at all, from the zeolite in an additional post-treatment.

In "The Synthesis of Discrete Colloidal Particles of TPA-Silicate-1", Zeolites Vol 14 (1994) pages 557 to 567, A. E. Persson describe discrete colloidal zeolite particles with an average size of less than 100 nm and a narrow particle size distribution. As factors influencing the particle size, high silica content in conjunction with high alkalinities were found. Thus, this process is restricted to silicalite zeolites having high silica content and, as already discussed above, high alkali metal content with its negative effects.

In "Low-Temperature Synthesis and Characterization of a Stable Colloidal TPA-Silicalite-1 Suspension", Zeolites Vol 18 (1997) pages 379 to 386, R. W. Corkery et al. describe a microporous zeolite material with a narrow size distribution, obtained by conventional techniques. The main focus of this article is the preparation of stable colloidal solution containing the zeolite particles.

In "Synthesis of ZSM-5 Zeolite with Small Crystal Size and its Catalytic Performance for Ethylene Oligomeriza-tion", Zeolites Vol 14 (1994) pages 643 to 649, M. Yamamura et al. describe zeolites having a specific Al:Si ratio and crystal sizes of 30 to 50 nm. These zeolites are obtained using conventional techniques, the factors influencing the crystal size being the Si:Al ratio and the OH:Si ratio.

In "Synthesis of Ultrafine Zeolite L", Proceedings of the 9th International Zeolite Conference. Montreal 1992 (R. von Ballmoos, editor), Butterworth-Heinemann (1993), pages 297 to 304, Xianping Meng et al. describe zeolite L particles having a size of about 30 nm, synthesized under hydrothermal conditions in an initial $K_2O$—$Al_2O_3$—$SiO_2$—$H_2O$ mixture. The optimal ranges of the concentrations of these compounds are investigated. Zeolites having an average diameter from about 60 to 650 nm or an average size from 300 to 1000 nm are disclosed.

In "Synthesis and Characterization of High-Quality Zeolite LTA and FAU Single Nanocrystals", Chem. Mater. 10 (1998) pages 1483 to 1486, Guangshan Zhu et al. describe the optimization of synthesis conditions to obtain crystals having a size of 50 nm or 80 nm. The crystal size is described to be dependent from the addition of NaCl instead of NaOH so that the alkalinity of the system is solely influenced by the tetramethylammonium hydroxide. Apart from this modification, this synthesis route follows conventional techniques.

In "Influence of Zeolite Particle Size on Selectivity During Fluid Catalytic Cracking", Applied Catalysis 23 (1986) pages 69 to 80, K. Rajagopalan et al. describe cracking catalysts having small, medium, or large particle size in the range of, e.g., 0.15 to 0.38, 0.24 to 0.88, or 0.70 to 1.042 micrometer. Particles of all sizes were obtained using conventional techniques.

In "Catalytic Cracking of Gasoil", Applied Catalysis 55 (1989) pages 65 to 74, M. A. Camblor et al. describe faujasite type Y zeolites with an average crystal size of 0.30 to 1.0 micrometer and a controlled crystal size distribution. No hint is given as to how to control the size distribution.

CA 2346892 A1 describes a process for the preparation of silica having micropores and mesopores. The pores are obtained by adding a polymer as sole pore forming agent to the reaction mixtures from which the silica crystals are obtained. The document is silent on crystal sizes, let alone a process in which a pore forming agent is used in combination with a polymer as size directing agent.

In "Confined Space Synthesis. A Novel Route to Nanosized Zeolites", Inorg. Chem. 39 (2000) pages 2279 to 2283, I. Schmidt et al. disclose a crystallisation of a zeolitic material inside the pore system of an inert mesoporous (soild-state) matrix. By proper choice of the matrix, it is described to be possible to control the size distribution of the zeolite. Carbon black was employed as matrix. Since solid-state matrices are described, the process lacks an easy control tool for influencing the size and size distribution of the zeolite since, in order to obtain a specific material, an adequate matrix has to be found or even newly synthesized.

Therefore, this prior art relates to controlling the crystal size and crystal size distribution, respectively, by adjusting the conventional synthesis gel composition, crystallisation time and/or temperature or by using the pore system an inert mesoporous matrix. However, these adjustments are comparatively complex.

Thus, it was an object of the present invention to provide a simple route for a size controlled synthesis of a nanosized zeolitic material having a narrow crystal size distribution.

In a scientific abstract by the inventor, published on the occasion of the 14th International Zeolite Conference, South Africa, Apr. 23–25, 2004, under the title "Synthesis of Uniformed Nanosized Zeolites from Reaction Gels inside Confined Polymer Spheroidal Voids", the concept of synthesizing nanosized zeolites with the size of 200 to 300 nm from reaction gels was presented. It was disclosed that zeolite TS-1, zeolite ZSM-5, and zeolite beta can be prepared in the presence of spheroidal polymer acrylates. However, the document is completely silent on the chemical nature of those polyacrylates as well as their concentrations to be used for the synthesis of those zeolites. Additionally, this abstract explicitly discloses that the crystal nanosize of the zeolites can be designed and controlled by the choice of various polymer spheroidals. Consequently, the abstract teaches that controlling the size of the crystals is achieved by varying the polyacrylate used during synthesis. Therefore, it is disclosed that only chemically different polyacrylates lead to different crystal sizes. Nothing is disclosed regarding specific values of crystal size distributions.

Therefore, it is an object of the present invention to provide a novel process for preparing a nanosized zeolitic material which has a narrow crystal size distribution.

It is a further object of the present invention to provide a process for preparing a nanosized zeolitic material which allows for preparing the material in a comparatively large range of crystal sizes where for each crystal size of a given material, a narrow size distribution is assured.

It is still another object of the present invention to provide a process for easily controlling the size of the crystals of a given nanosized zeolitic material whereby for each size, a narrow crystal size distribution is assured.

It is another object of the present invention to provide the nanosized zeolitic material as such, the material having a specific narrow particle size distribution.

It is yet another object of the present invention to provide the nanosized zeolitic material as such, the material having micropores, having essentially no mesopores and having a specific narrow crystal size distribution.

SUMMARY OF THE INVENTION

The present invention provides a process for preparing a zeolitic material, comprising
(i) preparing a mixture comprising the at least one silicon containing precursor compound from which the zeolitic framework is formed, at least one pore forming agent, and at least one polymer which has an essentially spheroidal geometry in the mixture;
(ii) crystallizing the zeolitic material from the mixture obtained in (i) to obtain the crystallized zeolitic material in its mother liquor.

The present invention provides a process for preparing a zeolitic material, comprising
(i) preparing a mixture comprising the at least one silicon containing precursor compound from which the zeolitic framework is formed, at least one pore forming agent, and at least one polymer which has an essentially spheroidal geometry in the mixture;
(ii) crystallizing the zeolitic material from the mixture obtained in (i) to obtain the crystallized zeolitic material in its mother liquor, wherein the size of the crystals is controlled by the concentration of the polymer present in the mixture according to (i).

The present invention also provides a method for controlling the size of the crystals of a zeolitic material in a process for preparing said zeolitic material, said process comprising (i) preparing a mixture comprising the at least one silicon containing precursor compound from which the zeolitic framework is formed, at least one pore forming agent, and at least one polymer which has an essentially spheroidal geometry in the mixture;
(ii) crystallizing the zeolitic material from the mixture obtained in (i) to obtain the crystallized zeolitic material in its mother liquor, wherein at least 80% of the crystals have a size in the range of from $(x-\Delta x)$ nm to $(x+\Delta x)$ nm, wherein $\Delta x$ is in the range of from 0 to 25, and wherein, for a given zeolitic material, x has a value in the range of from 50 to 500, the size of the crystals determined via TEM, said method for controlling the size of the crystals being characterized in that the higher the value of x to be obtained, the lower the concentration of the polymer in the mixture according to (i) has to be chosen.

The present invention also provides a zeolitic material, obtainable by aforementioned process.

The present invention also provides a zeolitic material, wherein at least 80% of the crystals of the material have a size in the range of from $(x-\Delta x)$ nm to $(x+\Delta x)$ nm, wherein $\Delta x$ is in the range of from 0 to 25, and wherein, for a given zeolitic material, x has a value in the range of from 50 to 500, the size of the crystals determined via TEM, and wherein preferably at least 90% of the crystals have a size in the range of from $(x-\Delta x)$ nm to $(x+\Delta x)$ nm, and wherein $\Delta x$ is preferably in the range of from 0 to 20.

DETAILED DESCRIPTION OF THE INVENTION

The present invention relates to a process for preparing a zeolitic material, comprising
(i) preparing a mixture comprising the at least one silicon containing precursor compound from which the zeolitic framework is formed, at least one pore forming agent, and at least one polymer which has an essentially spheroidal geometry in the mixture;
(ii) crystallizing the zeolitic material from the mixture obtained in (i) to obtain the crystallized zeolitic material in its mother liquor.

The size of the crystals as referred to in the context of the present invention are determined via electron microscopic method TEM (transmission electron microscopy). The determination of the size was accomplished as described for the two extremes, an essentially circular and an essentially rectangular shape in a TEM picture. In case the crystals to be examined had an essentially circular shape in the respective TEM picture, the diameter was used to describe the particle size. In case the crystals to be examined had an essentially rectangular shape in the respective TEM picture, the diagonal was used to describe the particle size.

Stage (i)

Zeolites are, as is known, crystalline aluminosilicates having ordered channel and cage structures and containing micropores which are preferably smaller than about 0.9 nm. The network of such zeolites is made up of $SiO_4$ and $AlO_4$ tetrahedra which are joined via shared oxygen bridges. An overview of the known structures may be found, for example, in W. M. Meier, D. H. Olson and Ch. Baerlocher, "Atlas of Zeolite Structure Types", Elsevier, 5th edition, Amsterdam 2001. Specific examples are zeolites having a pentasil structure, in particular the types assigned by X-ray analysis to the ABW, ACO, AEI, AEL, AEN, AET, AFG, AFI, AFN, AFO, AFR, AFS, AFT, AFX, AFY, AHT, ANA, APC, APD, AST, ATN, ATO, ATS, ATT, ATV, AWO, AWW, BEA, BIK, BOG, BPH, BRE, CAN, CAS, CFI, CGF, CGS, CHA, CHI, CLO, CON, CZP, DAC, DDR, DFO, DFT, DOH, DON, EAB, EDI, EMT, EPI, ERI, ESV, EUO, FAU, FER, GIS, GME, GOO, HEU, IFR, ISV, ITE, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, PAR, PAU, PHI, RHO, RON, RSN, RTE, RTH, RUT, SAO, SAT, SBE, SBS, SBT, SFF, SGT, SOD, STF, STI, STT, TER, THO, TON, TSC, VET, VFI, VNI, VSV, WIE, WEN, YUG and ZON structure and to mixed structures of two or more of the abovementioned structures.

Zeolites in which no aluminum is present and in which part of the Si(IV) in the silicate lattice is replaced by titanium as Ti(IV) are also known, such as titanium zeolites, in particular those having a crystal structure of the MFI type. Apart from silicon and titanium, such materials can further comprise additional elements such as aluminum, zirconium, tin, iron, cobalt, nickel, gallium, germanium, boron or small amounts of fluorine. A part or all of the titanium of the zeolite can be replaced by vanadium, zirconium, chromium or niobium or a mixture of two or more thereof. The molar ratio of titanium and/or vanadium, zirconium, chromium or niobium to the sum of silicon and titanium and/or vanadium and/or zirconium and/or chromium and/or niobium is generally in the range from 0.01:1 to 0.1:1.

Therefore, in addition to the silicon containing precursor, mixture (i) can optionally contain a precursor containing the elements described above, such as aluminum, zirconium, tin, iron, cobalt, nickel, gallium, germanium, boron, titanium, vanadium, chromium or niobium.

Silicon Containing Precursor Compounds

As silicon containing precursor (i), each precursor can be employed from which the zeolitic framework can be formed. For example, silica or a silica sol or a mixture of two or more different silica sols or a tetraalkoxysilane or a mixture of two or more different tetraalkoxysilanes or a mixture of at least one silica sol and at least one tetraalkoxysilane or a mixture of silica and at least one silica sol or a mixture of silica and at least one silica sol and at least one tetraalkoxysilane is preferably used.

Very generally, in the context of the present invention, compounds or mixtures of compounds of the composition $$Si(OR)_{4-x}(OR')_x$$

where x is 0, 1, 2, 3 or 4, may be used as the $SiO_2$ source, where R and R' may be different from one another and may each be hydrogen, $C_1$–$C_8$-alkyl, for example methyl, ethyl, n-propyl, isopropyl, n-butyl, isobutyl, tert-butyl, pentyl, hexyl, heptyl or octyl, $C_4$–$C_8$-cycloalkyl, such as cyclobutyl, cyclopentyl, cyclohexyl, cycloheptyl or cyclooctyl, aryl, alkylaryl or arylalkyl, or where R and R' may be identical and may each be hydrogen, $C_1$–$C_8$-alkyl, for example methyl, ethyl, n-propyl, isopropyl, n-butyl, isobutyl, tert-butyl, pentyl, hexyl, heptyl or octyl, $C_4$–$C_8$-cycloalkyl, such as cyclobutyl, cyclopentyl, cyclohexyl, cycloheptyl or cyclooctyl, aryl, alkylaryl or arylalkyl.

According to a preferred embodiment of the novel process, the $SiO_2$ source used is a compound of the composition $$Si(OR)_4$$

or of the composition $$Si(OR)_3(OR')$$

where R' is hydrogen and R is $C_1$–$C_8$-alkyl, for example methyl, ethyl, n-propyl, isopropyl, n-butyl, isobutyl, tert-butyl, pentyl, hexyl, heptyl or octyl.

The very particularly preferably used $SiO_2$ source is a compound of the composition $$Si(OR)_4$$

where R is $C_1$–$C_8$-alkyl, for example methyl, ethyl, n-propyl, isopropyl, n-butyl, isobutyl, tert-butyl, pentyl, hexyl, heptyl or octyl, more preferably methyl, ethyl, n-propyl, isopropyl, n-butyl, isobutyl or tert-butyl, more preferably methyl, ethyl, n-propyl or isopropyl, more preferably methyl or ethyl, particularly preferably ethyl.

Optional Precursor Compounds

In case the zeolitic framework additionally contains Al, at least one precursor compound containing Al is employed. All compounds which permit the preparation of the novel zeolitic material may be used as the aluminum source. In the novel process, aluminum nitrate, aluminum sulfate or a trialkoxyaluminate of the composition $Al(OR)_3$ or a mixture of two or more of these compounds is particularly preferably used as the aluminum source. Regarding the trialkoxyaluminates of the composition $Al(OR)_3$, the radicals R may be identical or different from one another and are $C_1$–$C_8$-alkyl, for example methyl, ethyl, n-propyl, isopropyl, n-butyl, isobutyl, tert-butyl, pentyl, hexyl, heptyl or octyl, $C_4$–$C_8$-cycloalkyl, such as cyclobutyl, cyclopentyl, cyclohexyl, cycloheptyl or cycloocty, aryl, alkylaryl or arylalkyl.

According to a very particularly preferred embodiment of the novel process, the aluminum source used is aluminum sulfate octadecahydrate.

Even more preferably, a zeolite ZSM-5 is prepared using at least one silicon containing precursor compound and at least one aluminum containing precursor compound.

In case the zeolitic framework additionally contains B, at least one precursor compound containing B is employed. All compounds which permit the preparation of the novel zeolitic material may be used as the boron source. In the novel process, for example, free boric acid and/or borates and/or boric esters, such as triethyl borate are employed as boron containing precursor compounds.

In case the zeolitic framework additionally contains Ti, at least one precursor compound containing Ti is employed. All compounds which permit the preparation of the novel zeolitic material may be used as the titanium source. In the novel process, for example, titanium alcoholates, such as titanium ethanolates or titanium propylates, or titanium butylates are employed as titanium containing precursor compounds. Especially preferred is TBOT (tetrabutoxy titanate). Even more preferably, a zeolite TS-1 is prepared using at least one silicon containing precursor compound and at least one titanium containing precursor compound.

In case the zeolitic framework additionally contains tin, at least one precursor compound containing fin is employed. All compounds which permit the preparation of the novel zeolitic material may be used as the tin source. In the novel process, for example, tin chlorides and/or organometallic tin compounds, such as tin alcoholates, or chelates, such as tin acetylaoetonates, are employed as tin containing precursor compounds.

In case the zeolitic framework additionally contains Zr, at least one precursor compound containing Zr is employed. All compounds which permit the preparation of the novel zeolitic material may be used as the zirconium source. In the novel process, for example, zirconium chloride and/or zirconium alcoholates are employed as zirconium containing precursor compounds.

In case the zeolitic framework additionally contains vanadium or germanium or niobium, at least one precursor compound containing vanadium or germanium or niobium is employed. All compounds which permit the preparation of the novel zeolitic material may be used as the vanadium source or germanium source or niobium source. In the novel process, for example, vanadium chloride or germanium chloride or niobium chloride are employed as vanadium or germanium or niobium containing precursor compounds.

Depending on the type of atoms which are incorporated into the lattice, a negatively charged framework which makes it possible, for example, to load the silicate with cations may form. Inter alia, the ammonium ions $R_1R_2R_3R_4N^+$ of the template compounds, platinum, palladium, rhodium or ruthenium cations, gold cations, alkali metal cations, for example sodium or potassium ions, or alkaline earth metal cations, for example magnesium or calcium ions, may be mentioned as such.

Therefore, according to specific embodiments, the present invention also relates to the process as described above, wherein the zeolitic material has the following formula $$N_{a+b}Al_aM_bSiO_2 \quad (I)$$

with "a" being in the range of from 0.00 to 1.00, "b" being in the range of from 0.00 to 0.05, N being selected from the group consisting of alkali metal ions, alkaline earth metal ions, the ammonium ion and a mixture of two or more thereof, and M being selected from the group consisting of $Fe^{3+}$, $B^{3+}$, $Ti^{4+}$, $V^{4+}$, $Zn^{2+}$, $Ge^{4+}$ and mixture of two or more thereof, wherein a and b are chosen such that the oxide according to formula (I) is electrically neutral.

According to another aspect of the present invention, zeolitic-like materials of formula (II)

$$N_bAl_aM_bPO_4 \quad (II)$$

can be prepared with the inventive process, with "a" being in the range of from 0.90 to 1.00, "b" being in the range of from 0.00 to 0.10, N being selected from the group consisting of alkali metal ions, the ammonium ion and a mixture of two or more thereof, and M being selected from the group consisting of $Fe^{3+}$, $B^{3+}$, $Li^+$, $Be^{2+}$, $Mg^{2+}$, $Ti^{4+}$, $V^{4+}$, $Zn^{2+}$, $Ge^{4+}$, $Ni^{2+}$, $Mn^{2+}$, $Co^{2+}$, $Si^{4+}$ and mixture of two or more thereof, and wherein "a" and "b" are chosen such that the oxide according to formula (II) is electrically neutral. If zeolitic-like materials of formula (II) are prepared, the at least one silicon containing precursor compound employed in (i) has to be replaced by at least one suitable precursor compound from which framework structures are obtained containing P.

Pore Forming Agent

As at least one pore forming agent, each compound can be employed which leads to the desired zeolitic material. Particularly preferred are pore forming agents which result in zeolitic materials having essentially no mesopores, preferably no mesopores in the context of the present invention, mesopores are understood as pores having a diameter, of from 2 to 50 nm and micropores as those having pore diameters of less than 2 nm. The pore diameters of the mesopores are determined by nitrogen adsorption at 77 K according to DIN 66134.

All compounds which permit the preparation of the novel zeolite material may be used as the pore forming agent. In the novel process, compounds are preferred containing the tetraalkylammonium ion $$[NRR'R''R''']^+$$

where R, R', R'' and R''' may be identical or different from one another and may each be hydrogen, $C_1$–$C_8$-alkyl, for example methyl, ethyl, n-propyl, isopropyl, n-butyl, isobutyl, tert-butyl, pentyl, hexyl, heptyl or octyl, $C_4$–$C_8$-cycloalkyl, such as cyclobutyl, cyclopentyl, cyclohexyl, cycloheptyl or cyclooctyl, are particularly preferably used as the template compound. According to a more preferred embodiment of the novel process, R, R', R'' and R''' are more preferably $C_1$–$C_8$-alkyl, for example methyl, ethyl, n-propyl, isopropyl, n-butyl, isobutyl, tert-butyl, pentyl, hexyl, heptyl or octyl, more preferably n-propyl or isopropyl, particularly preferably n-propyl.

For example, tetraalkylammonium chloride or tetraalkylammonium bromide can be employed.

According to a preferred embodiment of the process of the present invention, mixture (i) additionally contains a suitable base. Preferred bases are, e.g., bases containing $OH^-$. Examples for such bases are sodium hydroxide or potassium hydroxide. It is also possible to introduce $OH^-$ via at least one of the precursor compounds containing silicon, aluminum or another metal described above.

In the novel process, tetraalkylammonium hydroxides of the composition $$[NRR'R''R''']^+OH^-$$

are especially preferred, where R, R', R''and R''' may be identical or different from one another and may each be hydrogen, $C_1$–$C_8$-allyl, for example methyl, ethyl, n-propyl, isopropyl, n-butyl, isobutyl, tert-butyl, pentyl, hexyl, heptyl or octyl, $C_4$–$C_8$-cycloalkyl, such as cyclobutyl, cyclopentyl, cyclohexyl, cycloheptyl or cyclooctyl, are particularly preferably used as the template compound. According to a more preferred embodiment of the novel process, R, R', R'' and R''' are more preferably $C_1$–$C_8$-alkyl, for example methyl, ethyl, n-propyl, isopropyl, n-butyl, isobutyl, tert-butyl, pentyl, hexyl, heptyl or octyl, more preferably n-propyl or isopropyl, particularly preferably n-propyl.

Accordingly, the present invention also relates to a process as described above, a tetraalkoxysilane being used as the silicon containing precursor, an aluminum sulfate as the aluminum containing precursor and tetraalkylammonium hydroxide as the pore forming agent. Preferably, a zeolite ZSM-5 using tetrapropylammonium hydroxide or zeolite beta using tetraethylammonium hydroxide is prepared using these compounds.

Accordingly, the present invention also relates to a process as described above, a tetraalkoxysilane being used as the silicon containing precursor, tetrabutoxy titanate being used as titanium containing precursor, and tetraalkylammonium hydroxide as the pore forming agent. Preferably, a zeolite TS-1 is prepared using these compounds, in particular using tetrapropylammonium hydroxide as pore forming agent.

It is also envisaged to adapt the process of the present invention to materials where no pore forming agents is employed.

Preferably, the pH value of the mixture (i) subjected to crystallisation in stage (ii) is in the range of from 10 to 14, more preferably in the range of from 10 to 13. This pH is preferably chosen in case a tetraalkylammonium hydroxide is used as pore forming agent and/or a hydroxide base is used as base present in the synthesis gel.

Alternatively, if, for example, a mineralic acid is employed as silicon containing precursor compound, such as a fluoride containing mineralic acid, pH values in the range of from 2 to 4 are conceivable.

According to a preferred embodiment of the present invention, the mixture in (i) from which the zeolitic material is obtained in (ii) additionally comprises water or another suitable solvent in which the precursor compounds, the polymer and the pore forming agent are dissolved or dispersed or emulsified. As other suitable solvents, are, for example, alcohols such as methanol or ethanol or mixtures of two different alcohols. More preferably, the mixture in (i) comprises water or a mixture of water and at least one alcohol. Especially preferably, the solvent used in (i) is water such that the mixture in (i) is an aqueous mixture.

The abovementioned compounds, i.e. the at least one precursor compound, the at least one pore forming agent, preferably additionally the at least one solvent, especially preferably water, are employed in molar ratios which permit the preparation of the desired zeolitic materials According to a preferred embodiment, the mixture of (i), i.e. the synthesis gel, has a composition which allows for synthesizing zeolites of formula (I) as described above:

$$N_{a+b}Al_aM_bSiO_2 \quad (I)$$

In case, for example, a zeolite TS-1 is to, be synthesized, a synthesis gel is prepared having the following molar composition, wherein Si in the at least one $SiO_2$ precursor compound being calculated as $SiO_2$, Ti in the at least one Ti precursor compound being calculated as $TiO_2$ and the abbreviation TMP being the pore forming agent, preferably tetrapropylammonium hydroxide:

xTMP.$SiO_2$.y$TiO_2$.z$H_2O$ and x being from 0.04 to 0.3, y from 0.01 to 0.04 and z from 10 to 1000.

In case, for example, a zeolite ZSM-5 is to be synthesized, a synthesis gel is prepared having the following molar composition, wherein Si in the at least one $SiO_2$ precursor compound being calculated as $SiO_2$, Al in the at least one Al precursor compound being calculated as $Al_2O_3$ and the abbreviation TMP being the pore forming agent, preferably tetrapropylammonium hydroxide:

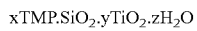

x TMP.$SiO_2$.y$Al_2O_3$.z$H_2O$ and x being from 0.04 to 0.3, y from 0.002 to 0.08 and z from 50 to 1000.

In case, for example, a zeolite beta is to be synthesized, a synthesis gel is prepared having the following molar composition, wherein Si in the at least one $SiO_2$ precursor compound being calculated as $SiO_2$, Al in the at least one Al precursor compound being calculated as $Al_2O_3$ and the abbreviation TMP being the pore forming agent, preferably tetrapropylammonium hydroxide:

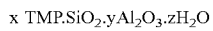

xTMP.$SiO_2$.y$Al_2O_3$.z$H_2O$ and x being from 0.2 to 0.45, y from 0.002 to 0.08 and z from 10 to 45.

Other novel and preferred reaction gels to which the at least one essentially spheroidal polymer is added according to the present invention are, for example Reaction gels for nanosized X and Y zeolites with molar ratios $Na_2O/Al_2O_3/SiO_2/H_2O$ of 20–35/1.0/15–20/300–600.

Reaction gels for nanosized L zeolite with molar ratios $K_2O/Na_2O/Al_2O_3/SiO_2/H_2O$ of 8–12/6–8/1.0/15–40/200–400.

Reaction gels for nanosized L zeolite with molar ratios $Al_2O_3/SiO_2/TEAOH/H_2O$ of 1.0–6.5/28.0–350/10.0–63.0/12.0–32.0/500–2000.

Reaction gels for nanosized MFI zeolite with molar ratios $Al_2O_3/SiO_2/TPABr$ or $TPAOH/H_2O$ of 0–1.0/10–70/3–7.5/500–2000.

Reaction gels for nanosized TS-1 zeolite with molar ratios $TiO_2/SiO_2/TPABr$ or $TPAOH/H_2O$ of 1.0/10–70/3–7.5/500–2000.

Therefore, the present invention also relates to a reaction gel, comprising at least one silicon containing precursor compound from which a zeolitic framework is formed, at least one pore forming agent, and at least one essentially spheroidal polymer. Preferably, the at least one pore forming agent contained in the reaction gel is a tetraalkylammonium hydroxide. Preferably, the at least one silicon containing precursor compound contained in the reaction gel is a tetraalkoxysilane. Preferably, the at least one essentially spheroidal polymer contained in the reaction gel is a polymer which contains building blocks derived from dimethylaminomethyl acrylate, methyl methacrylate, and/or butanediol diacrylate, with diethyl sulfate. More preferably, the at least one essentially spheroidal polymer contained in the reaction gel is a polymer which consists of building blocks derived from dimethylaminomethyl acrylate, methyl methacrylate, and/or butanediol diacrylate, with diethyl sulfate. Preferably, the reaction gel is an aqueous mixture of the compounds.

According to a first preferred embodiment, the mixture of (i) is obtained by first preparing a mixture containing the at least one pore forming agent, the at least one precursor compound and preferably water, by second optionally ageing the resulting mixture and, third, by adding the at least one essentially spheroidal polymer.

In this first preferred embodiment, the order of addition of the components of the mixture is as a rule not critical. According to a further preferred embodiment of the novel process, a solution or suspension or preferably a solution of the at least one pore forming agent, is initially taken, and the at least one precursor compound is added to this solution. This addition preferably takes place at from 5 to 40° C., more preferably from 15 to 35° C., particularly preferably from 20 to 30° C.

Ageing, which is preferred, is performed for a time period of preferably from 1 to 50 h, more preferably from 1 to 24 h and still more preferably from 1 to 12 h. Ageing temperatures are preferably in the range of from 20 to 150° C., more preferably from 50 to 145° C. and still more preferably from 100 to 140° C.

After having added the at least one essentially spheroidal polymer, the resulting mixture (i) is optionally further mixed, preferably stirred, for a time period preferably in the range of up to 12 h, more preferably up to 6 h. The temperature at which mixing is carried out is preferably in the range of from 20 to 150° C., more preferably from 50 to 145° C. and still more preferably from 100 to 140° C.

According to a second preferred embodiment, the mixture of (i) is obtained by directly mixing the at least one precursor compound, the at least one pore forming agent, preferably the base, preferably water, and the at least one polymer. The order of addition of the components of the mixture is as a rule not critical. According to a further preferred embodiment of the novel process, a solution or suspension or preferably a solution of the at least one pore forming agent, is initially taken, and the at least one precursor compound is added to this solution, and the at least one essentially spheroidal polymer is added thereto. Both additions preferably take place at from 5 to 40° C., more preferably from 15 to 35° C., particularly preferably from 20 to 30° C.

According to this second preferred embodiment, the resulting mixture can be further aged and/or mixed. The ageing and mixing temperature, respectively, is preferably in the range of from 20 to 150° C., more preferably from 50 to 145° C. and still more preferably from 100 to 140° C. Mixing is carried out for a time period preferably in the range of up to 12 h, more preferably up to 6 h. Ageing is performed for a time period of preferably from 1 to 50 h, more preferably from 1 to 24 h and still more preferably from 1 to 12 h.

Polymers

The chemical nature and/or molecular weights of the at least one essentially spheroidal polymer present in mixture (i) are established so that the zeolitic material having the desired crystal size and the desired narrow crystal size distribution is obtained.

According to a preferred embodiment of the present invention, the at least one essentially spheroidal polymer has a mean diameter in the range of from 50 to 500 nm.

In the context of the present invention, the term "mean diameter of an essentially spheroidal polymer" relates to the mean diameter as determined via unimodal analysis using a Beckmann Coulter N4 Plus submibron particle sizer at T=23° C. and a run time of 3.0 microseconds, further using water as diluent.

According to a first aspect of the present invention, the size and size distribution of the crystals of the zeolitic material are controlled by the specific choice of the chemical nature of the polymer. Thus, a specific choice of the at least one polymer leads to a specific crystal size and crystal size distribution of the zeolitic material obtained. In case a different zeolitic material is desired, a different polymer has to be used, wherein the polymers used for synthesizing the different materials can differ in the respective chemical nature and/or molecular weight.

While this adjustment of the polymers for controlling the size and size distribution is encompassed by the present invention, it was found that, using essentially spheroidal polymers in mixture (i), there is an easier way of controlling the desired parameters size and size distribution.

Surprisingly, crystal size and crystal size distribution of the zeolitic material obtained in (ii) can be easily controlled by suitably adjusting the concentration of the at least one polymer employed in (i).

Therefore, the present invention also relates to a process for preparing a zeolitic material, comprising
(i) preparing a mixture comprising the at least one silicon containing precursor compound from which the zeolitic framework is formed, at least one pore forming agent, and at least one polymer which has an essentially spheroidal geometry in the mixture;
(ii) crystallizing the zeolitic material from the mixture obtained in (i) to obtain the crystallized zeolitic material in its mother liquor, wherein the size of the crystals is controlled by the concentration of the polymer present in the mixture according to (i).

Even more surprisingly, it was found that at least in a specific range of crystal sizes, preferably a range of from 50 to 500 nm, a narrow crystal size distribution is obtained, irrespective of the concentration of the polymer. Preferably, the narrow size distribution is in the range of from $(x-\Delta x)$ nm to $(x+\Delta x)$ nm, wherein $\Delta x$ is in the range of from 0 to 25, and wherein, for a given zeolitic material, x has a value in the range of from 50 to 500, the size of the crystals determined via TEM, at least 80% of the crystals having a size in said range.

Crystal sized up to 30 nm are also possible. Therefore, also ranges of the crystal size of, for example, 30 to 500 nm or 30 to 400 nm, are also encompassed by the present invention.

Therefore, the present invention also relates to the process as described above, wherein at least 80% of the crystals have a size in the range of from $(x-\Delta x)$ nm to $(x+\Delta x)$ nm, wherein $\Delta x$ is in the range of from 0 to 25, and wherein, for a given zeolitic material, x has a value in the range of from 50 to 500, the size of the crystals determined via TEM.

More preferably, the present invention relates to the process as described above, wherein at least 90% of the crystals have a size in the range of from $(x-\Delta x)$ nm to $(x+\Delta x)$ nm, and wherein $\Delta x$ is in the range of from 0 to 20.

According to another aspect, the present invention also provides the zeolitic materials as such, wherein at least 80%, more preferably at least 90% of the crystals have a size in the range of from $(x-\Delta x)$ nm to $(x+\Delta x)$ nm, wherein $\Delta x$ is in the range of from 0 to 25, preferably from 0 to 20, and wherein, for a given zeolitic material, x has a value in the range of from 50 to 500, the size of the crystals determined via TEM.

In order to synthesize a zeolitic material having a crystal size in the range of from 50 to 500 nm and a size distribution of $\Delta x$ from 0 to 25, preferably from 0 to 20, at least one suitable essentially spheroidal polymer is used having a mean diameter of 50 to 500 nm, as described above. More preferably, the mean diameter of the at least one polymer is in the range of from 60 to 400 nm; more preferably of from 70 to 350 nm, more preferably of from 80 to 300 nm, more preferably of from 90 to 260 nm, more preferably of from 100 to 200 nm, and still more preferably of from 125 to 175 nm.

As to the above-mentioned preferred range of crystal sizes, the concentration of the at least one essentially spheroidal polymer is preferably in the range of from 0.01 to 5 g (polymer)/g (silicon contained in mixture (i)), the silicon calculated as $SiO_2$.

According to a more preferred embodiment, the present invention provides a process which allows for preparing a zeolitic material wherein at least 80%, more preferably at least 90% of the crystals have a size in the range of from $(x-\Delta x)$ nm to $(x+\Delta x)$ nm, wherein $\Delta x$ is in the range of from 0 to 25, preferably from 0 to 20, and wherein, for a given zeolitic material, x has a value in the range of from 50 to 500, the size of the crystals determined via TEM, by employing the at least one essentially spheroidal polymer in mixture (i) in a concentration in the range of from 0.01 to 5 g (polymer)/g (silicon contained in mixture (i)), more preferably in the range of from 0.02 to 4.5 g, still more preferably in the range of from 0.03 to 4 g, the silicon calculated as $SiO_2$, and wherein the mean diameter of the polymer is preferably in the range of from 50 to 500 nm, more preferably in the range of from 60 to 400 nm, more preferably of from 70 to 350 nm, more preferably of from 80 to 300 nm, more preferably of from 90 to 250 nm, more preferably of from 100 to 200 nm, and still more preferably of from 125 to 175 nm.

Thus, according to an especially preferred embodiment, the present invention provides a process which allows for preparing a zeolitic material wherein at least 90% of the crystals have a size in the range of from $(x-\Delta x)$ nm to $(x+\Delta x)$ nm, wherein $\Delta x$ is in the range of from 0 to 20, and wherein, for a given zeolitic material, x has a value in the range of from 50 to 500, the size of the crystals determined via TEM, by employing the at least one essentially spheroidal polymer in mixture (i) in a concentration in the range of from 0.03 to 4 g (polymer)/g (silicon contained in mixture (i)), the silicon calculated as $SiO_2$, and wherein the mean diameter of the polymer is preferably in the range of from 125 to 175 nm.

Even more surprisingly, it was found that by increasing the concentration of the at least one polymer in mixture (i), it was possible to decrease the crystal size of the zeolitic material in a controlled manner.

In order to exemplify this novel concept of synthesizing zeolitic materials in a controlled manner, some correlations of the concentration of the essentially spheroidal polymer, having a most preferred mean diameter in the range of from 125 to 175 nm, and obtained crystal sizes according to the novel process are given hereinunder. For each particle size obtained, the size distribution is within the narrow range of $\Delta x=0$ to 20.

| concentration of polymer/g (polymer)/ g (silicon contained in mixture (i)) | particle size obtained/nm |
|---|---|
| 0.40–0.45 | 300 |
| 0.80–0.90 | 200 |
| 1.60–1.70 | 100 |
| 2.00–2.10 | 80 |

According to a still more preferred embodiment, this correlation applies for an essentially spheroidal polymer having a mean diameter in the range of from 130 to 170 nm, more preferably of from 135 to 165 nm, more preferably in the range of from 140 to 160 nm and still more preferably in the range of from 145 to 155 nm. Still more preferably, this correlation applies for a zeolite TS-1 or a zeolite ZSM-5 or a zeolite beta to be synthesized.

When preparing the mixture according to (i) according to above-described first or second preferred embodiment, the polymer is most preferably introduced as polymer dispersion. Generally, any suitable polymer obtainable by free radical, anionic or cationic polymerization may be used as the polymer dispersion. In general, it will be a polymer obtained by emulsion polymerization. However, polymers which are obtainable by another polymerization method, for example by suspension polymerization, can also be used. Preferably, the polymer is employed in the form of a dispersion which has in particular a polymer content of from 20 to 60, in particular from 30 to 50, % by weight based on the total weight of the dispersion. This may be a primary dispersion, i.e. a dispersion as obtained in the emulsion polymerization, or a secondary dispersion, i.e. a dispersion which is obtained by subsequent dispersing of an already isolated polymer in the dispersing medium.

The dispersing medium is as a rule water. However, water-miscible organic solvents, such as alcohols and ketones, for example methanol, ethanol, n-propanol, isopropanol, n-butanol, acetone or methyl ethyl ketone, may also be present. The polymers are preferably prepared by free radical polymerization of ethylenically unsaturated monomers. Most preferably, the dispersing medium is water such that the mixture in (i) is an aqueous mixture.

For example, particularly suitable monomers are:

ethylenically, preferably α,β-ethylenically unsaturated mono- and dicarboxylic acids, in particular those of 3 to 6 carbon atoms. Examples of these are acrylic acid, methacrylic acid, crotonic acid, fumaric acid, maleic acid, 2-methylmaleic acid or itaconic acid, as well as monoesters of ethylenically unsaturated dicarboxylic acids, such as monoalkyl maleates of $C_1$–$C_8$-alkanols;

vinylaromatic compounds, such as styrene, α-methylstyrene and vinyltoluenes;

linear 1-olefins, branched 1-olefins or cyclic olefins, e.g. ethene, propene, butene, isobutene, pentene, cyclopentene, hexene, cyclohexene, octene, 2,4,4-trimethyl-1-pentene, $C_8$–$C_{10}$-olefins, 1-dodecene, $C_{12}$–$C_{14}$-olefins, octadecene, 1-eicosene ($C_{20}$), $C_{20}$–$C_{24}$-olefins, oligoolefins prepared by metallocene catalysis and having a terminal double bond, e.g. oligopropene, oligohexene and oligooctadecene, olefins prepared by cationic polymerization and having a high α-olefin fraction, such as polyisobutene;

butadiene;

vinyl and allyl alkyl ethers where the alkyl radical is of 1 to 40 carbon atoms, it being possible for the alkyl radical also to contain further substituents, such as hydroxyl, amino or dialkylamino or one or more alkoxylate groups, e.g. methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether or methyldiglycol vinyl ether, and the corresponding allyl ethers and mixtures thereof;

acrylamides and alkyl-substituted acrylamides, e.g. acrylamide, methacrylamide, N-tert-butylacrylamide or N-methyl(meth)acrylamide;

sulfo-containing monomers, e.g. allylsulfonic acid, methallylsulfonic acid, styrene sulfonate, vinylsulfonic acid, allyloxybenzenesulfonic acid, 2-acrylamido-2-methylpropanesulfonic acid, the corresponding alkali and ammonium salts thereof and mixtures thereof;

$C_1$- to $C_8$-alkyl esters or hydroxy-$C_1$- to $C_4$-alkyl esters of $C_3$- to $C_6$-mono- or dicarboxylic acids (see above), in particular of acrylic acid, methacrylic acid or maleic acid, or esters of $C_1$- to $C_{18}$-alcohols, alkoxylated with from 2 to 50 mol of ethylene oxide, propylene oxide, butylene oxide or mixtures thereof, with the stated acids, e.g. methyl (meth)acrylate, ethyl(meth)acrylate, propyl(meth) acrylate, isopropyl(meth)acrylate, butyl(meth)acrylate, hexyl(meth)acrylate, 2-ethylhexyl(meth)acrylate, hydroxyethyl (meth)acrylate, hydroxypropyl(meth)acrylate, butynediol 1,4-monoacryate, dibutyl maleate, ethyldiglycol acrylate, methylpolyglycol acylate (11 EO), (meth)acrylic esters of $C_{13}/C_{15}$-oxo alcohol reacted with 3, 5, 7, 10 or 30 mol of ethylene oxide, or mixtures thereof;

alkylaminoalkyl(meth)acrylates or alkylaminoalkyl-(meth) acrylamides, e.g. 2-(N,N-dimethylamino)ethyl (meth) acrylate, 3-(N,N-dimethylamino)propyl(meth)acrylate, 2-(N,N,N-trimethylammonium)ethyl(meth)acrylate chloride, 2-dimethylaminoethyl(meth)acrylamide, 3-dimethylaminopropyl(meth)acrylamide or 3-trimethylammoniumpropyl(meth)acrylamide chloride, and their quaternization products, for example with dimethyl sulfate, diethyl sulfate or other alkylating agents, vinyl and allyl esters of $C_1$- to $C_{30}$-monocarboxylic acids, such as vinyl formate, vinyl 2-ethylhexanoate, vinyl nonanoate, vinyl decanoate, vinyl pivalate, vinyl palmitate, vinyl stearate or vinyl laurate.

The following may be mentioned as further monomers: vinylformamide, N-vinyl-N-methylformamide, styrene, 2-methylstyrene, 3-methylstyrene, butadiene, N-vinylpyrrolidone, N-vinylimidazole, 1-vinyl-2-methyl-imidazole, 1-vinyl-2-methylimidazoline, N-vinylcaprolactam, acrylonitrile, methacrylonitrile, allyl alcohol, 2-vinylpyridine, 4-vinylpyridine, diallyldimethylammonium chloride, vinylidene chloride, vinyl chloride, acrolein, methacrolein and vinylcarbazole and mixtures thereof; quaternization products of said N-vinylimidazole monomers with dimethyl sulfate, diethyl sulfate or other alkylating agents.

Especially preferred monomers are esters of acrylic acid and methacrylic acid, vinylaromatic compounds, butadiene, vinyl esters, (meth)acrylonitrile and (meth)acrylamides.

Particularly preferred monomers are methyl acrylate, ethyl acrylates, butyl acrylates, 2-ethylhexyl acrylate, methyl methacrylate, butyl methacrylate, hydroxyethyl acrylates, hydroxypropyl acrylate, hydroxybutyl acrylate, hydroxyethyl methacrylate, styrene, butadiene, vinyl acetate, acrylonitrile, methacrylonitrile, acrylamide, methacrylamide and/or N-butylacrylamide.

The polymers can be prepared by conventional polymerization processes, for example by free radical mass, emulsion, suspension, dispersion, solution and precipitation polymerization. Said polymerization processes are preferably carried out in the absence of oxygen, preferably in a stream of nitrogen. For all polymerization methods, the conventional apparatuses are used, for example stirred kettles, stirred kettle cascades, autoclaves, tube reactors and kneaders. The emulsion, precipitation or suspension polymerization method is preferably used. The free radical emulsion polymerization method in an aqueous medium is particularly preferred.

When the aqueous emulsion polymerization is employed, polymers having a weight average molecular weight of from 1000 to 2,000,000, preferably from 5000 to 500,000 g, more preferably from 7,500 to 100,000 g, and still more preferably from 10,000 to 50,000 g are obtained. The K values are in general from 15 to 150 (1% strength by weight in dimethylformamide). The mean particle size of those essentially spheroidal polymers is most preferably in the range of from 50 to 500 nm, more preferably in the range of from 60 to 400 nm, more preferably of from 70 to 350 nm, more preferably of from 80 to 300 nm, more preferably of from 90 to 250 nm, more preferably of from 100 to 200 nm, and still more preferably of from 125 to 175 nm, with the range of from 130 to 170 nm being more preferred, the range of from 135 to 165 nm being still more preferred, the range of from 140 to 160 nm being still more preferred and the range of from 145 to 155 nm being most preferred. The emulsion polymerization can be carried out such that the solids volume content is from 10 to 70%, preferably from 20 to 60%.

The polymerization is preferably carried But in the presence of compounds forming free radicals (initiators). Preferably from 0.05 to 15, particularly preferably from 0.2 to 8, % by weight, based on the monomers used in the polymerization, of these compounds are required.

Suitable polymerization initiators are the known initiators described in EP 0 831 059 A1, for example peroxides, hydroperoxides, peroxodisulfates, percarbonates, peroxoesters, hydrogen peroxide and azo compounds. Examples of initiators which may be water-soluble or water-insoluble are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumyl hydroperoxide, tert-butyl perneodecanoate, tert-amyl perpivalate, tert-butyl perpivalate, tert-butyl pemeohexanoate, tert-butyl per-2-ethylhexanoate, tert-butyl perbenzoate, lithium, sodium, potassium and ammonium peroxodisulfate, azobisisobutyronitrile, 2,2'-azobis(2-amidinopropane) dihydrochloride 2-(carbamoylazo)isobutyronitrile and 4,4-azobis(4-cyanovaleric acid). The known redose initiator systems, too, can be used as polymerization initiators.

The initiators can be used alone or as a mixture with one another, for example mixtures of hydrogen peroxide and sodium peroxodisulfate. For polymerization in an aqueous medium, water-soluble initiators are preferably used.

In order to prepare polymers having a low average molecular weight, it is often expedient to carry out the copolymerization in the presence of regulators. Conventional regulators may be used for this purpose, for example organic compounds containing SH groups, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$- to $C_4$-aldehydes, such as formaldehyde, acetaldehyde and propionaldehyde, hydroxylammonium salts, such as hydroxylammonium sulfate, formic acid, sodium bisulfite and isopropanol. The polymerization regulators are used in general in amounts of from 0.1 to 10% by weight, based on the monomers.

To prepare relatively high molecular weight or crosslinked copolymers, it is often expedient to carry out the polymerization in the presence of crosslinking agents. Such crosslinking agents are compounds having two or more ethylenically unsaturated groups, for example diacrylates or dimethacrylates of at least dihydric saturated alcohols, e.g. ethylene glycol diacrylate, ethylene glycol dimethacrylate, 1,2-propylene glycol diacrylate, 1,2-propylene glycol dimethacrylate, neopentylglycol dimethacrylate, 3-methylpentanediol diacrylate and 3-methylpentanediol dimethacrylate, The acrylates and methacrylates of alcohols having more than 2 OH groups may also be used as crosslinking agents, e.g. trimethylolpropane triacrylate or trimethylolpropane trimethacrylate. A further class of crosslinking agents comprises diacrylates or dimethacrylates of polyethylene glycols or polypropylene glycols having molecular weights in each case of from 200 to 9,000.

In addition to the homopolymers of ethylene oxide or propylene oxide, it is also possible to use block copolymers of ethylene oxide and propylene oxide or copolymers of ethylene oxide and propylene oxide which contain the ethylene oxide and propylene oxide units randomly distributed. Furthermore, the oligomers of ethylene oxide or of propylene oxide are suitable for the preparation of the crosslinking agents, e.g. diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Further suitable crosslinking agents are vinyl acrylate, vinyl methacrylate, vinyl itaconate, divinyl adipate, butanediol divinyl ether, trimethylolpropane trivinyl ether, allyl acrylate, allyl methacrylate, pentaallylsucrose, methylenebis (meth)acrylamide, divinylethyleneurea, divinylpropyleneurea, divinylbenzene, divinyidioxane, triallyl cyanurate, tetraallylsilane, tetravinylsilane and bis- and polyacryloylsiloxanes (e.g. Tegomere® from Th. Goldschmidt AG). The crosslinking agents are preferably used in amounts of from 0.05 to 50, preferably from 0.1 to 20, in particular from 0.5 to 10, % by weight, based on the monomers to be polymerized.

It the emulsion, precipitation, suspension or dispersion polymerization method is used, it may be advantageous to stabilize the polymer droplets or polymer particles by means of surfactants. Emulsifiers or protective colloids are typically used for this purpose. Anionic, nonionic, cationic and amphoteric emulsifiers are suitable. Anionic emulsifiers, for example alkylbenzenesulfonic acids, sulfonated fatty acids, sulfosuccinates, fatty alcohol sulfates, alkylphenol sulfates and fatty alcohol ether sulfates, are preferred. Nonionic emulsifiers which may be used are, for example, alkylphenol ethoxylates, primary alcohol ethoxylates, fatty acid ethoxylates, alkanolamide ethoxylates, fatty amine ethoxylates, EO/PO block copolymers and alkylpolyglucosides. For example, the following may be used as cationic or amphoteric emulsifiers: quaternized aminoalkoxylates, alkylbetaines, alkylamidobetaines and sulfobetaines. Long-chain quaternary amines, for example fatty amines quaternized with dimethyl sulfate, are also suitable.

Protective colloids are, for example, cellulose derivatives, polyethylene glycol, polypropylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylamine, polyvinylformamide, polyvinylimidazole, polyvinylsuccinimide, polyvinyl-2-methylsuccinimide, polyvinyl-1,3-oxazolid-2-one, polyvinyl-2-methylimidazoline and copolymers containing acrylic acid, methacrylic acid, maleic acid or maleic anhydride. The emulsifiers or protective colloids are usually used in concentrations of from 0.05 to 20% by weight, based on the monomers.

If polymerization is effected in aqueous emulsion or dilution, the monomers and emulsifiers may be wholly or partly neutralized before or during the polymerization by means of conventional, inorganic or organic bases or acids. Suitable bases are, for example, alkali metal or alkaline earth metal compounds, such as sodium, potassium or calcium hydroxide, sodium carbonate, ammonia and primary, secondary or tertiary amines, such as di- or triethanol amine. Suitable acids are, for example, hydrochloric acid, sulfuric acid, phosphoric acid, formic acid and acetic acid.

Cationic aqueous polymer dispersions which have been stabilized with cationic emulsifiers and/or cationic auxiliary monomers (emulsifiers or alpha, beta-ethylenically unsaturated monomers which contain quaternary amine or ammonium structures) are particularly preferably used. These emulsion polymers are preferably prepared using free radical formers containing cationic groups, Particularly preferred monomers are methyl methacrylate, styrene, n-butyl acrylate, butanediol diacrylate and N,N-dimethylaminoethyl methacrylate quaternized with diethyl sulfate. Preferably, the polymer dispersion contains polymers having basic building blocks comprising methyl methacrylate, butanediol diacrylate, and/or dimethylaminoethyl methacrylate quaternized with diethyl sulfate.

Therefore, the present invention also relates to the process as described above, wherein the polymer contains building blocks derived from dimethylaminomethyl acrylate, methyl methacrylate, and/or butanediol diacrylate, quaternized with diethyl sulfate.

Most preferred are polymers containing building blocks derived from dimethylaminomethyl acrylate, quaternized with diethyl sulfate, methyl methacrylate, and butanediol diacrylate.

Still more preferred are polymers containing from 1 to 10%, more preferably from 2 to 8% and still more preferably from 3 to 6 % building blocks derived from dimethylaminomethyl acrylate, quaternized with diethyl sulfate, from 80 to 98%, more preferably from 84 to 96% and still more preferably from 88 to 94% building blocks derived from methyl methacrylate, and from 1 to 10%, more preferably from 2 to 8% and still more preferably from 3 to 6% building blocks derived from butanediol diacrylate.

The polymerization can be carried out in a conventional manner by a large number of different methods, continuously or batchwise. If the polymer is prepared by a solution, precipitation or suspension polymerization method in a steam-volatile solvent or solvent mixture, the solvent can be separated off by passing in steam, in order thus to obtain an aqueous solution or dispersion. The polymer can also be isolated from the organic diluent by a drying process.

The polymer may be, for example, a rubber, such as an epichlorohydrin rubber, ethylene/vinyl acetate rubber, chlorosulfinated polyethylene rubber, silicone rubber, polyether rubber, diene rubber, such as, butadiene rubber, acrylate rubber, ethylene/propylene rubber, ethylene/propylene/diene rubber or butyl rubber or similar rubber.

In the case of secondary dispersions, polymers not prepared by free radical polymerization, e.g. polysiloxanes, polyurethanes and polyesters, can also be used.

The glass transition temperature of the polymer dispersions used according to the invention (measured in the dry state by means of DSC) is from −50 to +150° C., preferably from 0 to 110° C.

Stage (ii)

The mixture of (i) is subjected to suitable conditions in stage (ii) of the novel process such that the zeolitic material is crystallized and the crystals having a narrow size distribution are obtained.

Depending on the $SiO_2$ precursor compound and/or other precursor compounds such as Al precursors, Ti precursor, or the like, it is possible for one or more alcohols to form in the mixture according to (i) by, for example, hydrolysis. According to an embodiment of the present invention, this at least one alcohol is separated off before the crystallization of the zeolite material. It is possible to use all suitable separation methods, distilling off being particularly preferred. Here, the distillation can preferably be effected, for example, at atmospheric or reduced pressure. More preferably, the at least one alcohol is distilled off at bottom temperatures of from 85 to 95° C., in particular from 90 to 95° C.

Accordingly, the present invention also relates to a process as described above, the alcohol formed in the mixture according to (i) being distilled off before the crystallization according to (ii).

According to a more preferred embodiment of the novel process, the mixture obtained after separating off the at least one alcohol obtained from the hydrolysis, more preferably the bottom product obtained from the distillation, is mixed with, particularly preferably, water, more preferably with demineralized water. Preferably, the amount of water added is such that the distillation loss is roughly compensated.

The reaction according to (ii), from which crystalline zeolitic material in its mother liquor is obtained, preferably takes place preferably at from 100 to 180° C., more preferably of from 110 to 170° C., more preferably of from 120 to 160° C., and in particular from 130 to 150° C.

According to a particularly preferred embodiment of the novel process, the crystallisation according to (ii) takes place in an autoclave, for example in a steel autoclave. More preferably, the reaction mixture is stirred at least during a part of the reaction time.

The duration of the crystallization according to (ii) is preferably from 1 to 150 hours, more preferably from 1 to 96 hours, more preferably from 1 to 48 h, and particularly preferably from 1 to 24 hours.

The pressure during this crystallization according to (ii) is preferably from atmospheric pressure to 50 bar, more preferably from 5 to 25, particularly preferably from 10 to 15, bar.

Accordingly, the present invention also relates to a process as described above, the crystallization according to (ii) being carried out at from 100 to 180° C. in an autoclave for a reaction time of from 1 to 96 hours.

According to a further preferred embodiment of the present invention, the novel process comprises at least one of following stages (iii), (iv), and (v), preferably all stages (iii) to (v):

(iii) separating the crystals obtained from (ii) from the mother liquor;
(iv) drying the separated crystals;
(v) calcining the dried crystals.

According to a preferred embodiment, the pH of the mother liquor containing the crystalline zeolitic material is brought into the range of from 5.5 to 7.5, preferably from 6 to 7, preferably after cooling to about room temperature and before the separation according to (iii) by addition of at least one suitable compound.

Particularly preferably, suitable compounds here are Broenstedt acids, for example hydrochloric acid, sulfuric acid, phosphoric acid, nitric acid or carboxylic acids, dicarboxylic acids or oligo- or polycarboxylic acids, which can be used alone or as a mixture of two or more thereof. Furthermore, said acids can be used in concentrated form or in dilute solution. If the acids are used in solution, for example, water is particularly preferred as a solvent. Acids here are very particularly preferably those which can be removed in a subsequent calcination step, for example carboxylic acids or nitric acid.

According to a particularly preferred embodiment of the novel process, the crystalline zeolitic material, preferably zeolite ZSM-5, zeolite TS-1, or zeolite beta, is separated from its mother liquor by a suitable process according to (iii) and more preferably dried according to (iv) by one or more suitable methods and preferably subsequently calcined. The calcination can preferably be effected, for example, in a suitable gas atmosphere, air and/or lean air particularly preferably being used as the gas atmosphere.

All solid-liquid separation methods for separating the crystalline zeolite material from its mother liquor are conceivable. Inter alia, filtration, ultrafiltration, diafiltration or centrifugation methods or, for example, spray-drying or spray-granulation methods may be mentioned. The crystalline zeolite material is preferably separated from the mother liquor by ultrafiltration, filtration, or centrifugation.

Before the separation of the crystalline zeolitic material from the mother liquor, it is possible to increase the content of zeolitic material in the mother liquor by concentration. Details of the isolation of the crystalline zeolitic material from the mother liquor are also to be found in US 2004014591 A1, especially paragraphs [0010] to [0016] which is hereby incorporated by reference.

Where further drying is desired, for example after spray drying, the zeolite material isolated from the mother liquor is dried at in general from 80 to 160° C., preferably from 90 to 145° C., particularly preferably from 100 to 130° C., the duration of drying generally being 6 hours or more, for example from 6 to 24 hours. However, depending on the moisture content of the material to be dried, shorter drying times, for example about 1, 2, 3, 4 or 5 hours, are also possible.

The calcination subsequently is carried out according to (iv) preferably at least once. During calcination, the at least one pore forming agent and the at least one essentially spheroidal polymer and, if required, the at least one acid described above are removed from the crystalline material. Calcination is carried out preferably at a temperature in the range of from 400 to 750° C., preferably from 450 to 600° C., and particularly preferably from 490 to 530° C.

The calcination can be effected under any suitable gas atmosphere, air and/or lean air being preferred. Furthermore, the calcination is preferably carried out in a muffle furnace, rotary kiln and/or a belt calcination furnace, the duration of calcination generally being 1 hour or more, for example from 1 to 24 or from 4 to 12 hours. Accordingly, it is possible in the novel process, for example, to calcine the zeolite material once, twice or more often for in each case at least 1 hour, for example in each case from 4 to 12, preferably from 4 to 8, hours, it being possible for the temperatures during a calcination step to remain constant or to be changed continuously or discontinuously. If calcination is effected twice or more often, the calcination temperatures in the individual steps may be different or identical.

Accordingly, the present invention also relates to a process as described above, the crystalline material which is separated according to (iii) first being dried at from 80 to 160° C. according to (iv) and then calcined according to (v) at a from 400 to 750° C.

After calcination, a zeolitic material is obtained which, compared to conventionally prepared zeolitic material, has an increased surface area determined using the BJH model according to DIN 66131.

Therefore, the present invention also provides a process for preparing a zeolitic material in the presence of an essentially spheroidal polymer, which zeolitic material has an increased surface area compared to a conventionally prepared zeolitic material synthesized in the absence of said polymer.

In case, for example, a zeolite ZSM-5 is prepared according to the present invention, a zeolitic material is obtained having a BET surface according to DIN 66134 in the range of from 490 to 500 $m^2/g$ while the respective conventionally prepared zeolitic material has a surface in the range of from 340 to 360 $m^2/g$.

In case, for example, a zeolite TS-1 is prepared according to the present invention, a zeolitic material is obtained having a BET surface according to DIN 66134 in the range of from 510 to 520 $m^2/g$ while the respective conventionally prepared zeolitic material has a surface in the range of from 340 to 360 $m^2/g$.

Therefore, the present invention also relates to a process as described above, the zeolitic material having a BET surface, determined via DIN 66131, in the range of from 300 to 700 $m^2/g$, preferably of from 400 to 700 $m^2/g$, more preferably of from 450 to 700 $m^2/g$.

According to a further embodiment of the novel process, the zeolitic material can be subjected to at least one wash process after the isolation and/or after the drying and/or after the calcination, the crystalline material isolated being brought into contact with at least one suitable wash substance. Very particularly preferably, the crystalline zeolitic material is washed with water prior to drying. In the context of the present invention, the wash process can be effected either with water in the liquid state or with steam, embodiments in which the wash process is carried out with both water in the liquid state and steam, simultaneously or in any desired sequence, also being possible. Preferably, washing is effected with liquid water.

If the treatment with steam is chosen, the zeolitic material isolated is particularly preferably brought into contact with steam at from 100 to 750° C., preferably from 100 to 250° C., particularly preferably from 120 to 175° C., this contacting preferably lasting for from 12 to 48 hours. Very particularly preferably, this contacting takes place in an autoclave.

In addition to or instead of the at least one wash process, the zeolite material isolated can be treated with a concentrated or dilute Broenstedt acid or a mixture of two or more Broenstedt acids. Suitable acids are, for example, hydrochloric acid, sulfuric acid, phosphoric acid, nitric acid or carboxylic acids, dicarboxylic acids or oligo- or polycarboxylic acids, for example nitrilotriacetic acid, sulfosalicylic acid or ethylenediaminotetraacetic acid. According to a preferred embodiment of the novel process, this step is dispensed with.

Where the zeolitic material was dried and/or calcined after separation from the mother liquor as described above and was subjected to a wash process and/or treatment with at least one Broenstedt acid after the drying and/or the calcination, a further drying and/or calcination follows according to a particularly preferred embodiment of the present invention.

This drying is effected at in general from 80 to 160° C., preferably from 90 to 145° C., particularly preferably from 100 to 130° C. The calcination preferably effected subsequently is carried out at in general from 400 to 750° C., preferably from 450 to 600° C., particularly preferably from 490 to 530° C.

This, the present invention provides a process for preparing a zeolitic material in which two structure directing agents are employed: one of these agents is the pore forming agent which allows for the formation of the micropores of the zeolitic material, while the other agent is the essentially spheroidal polymer which directs the crystal size and the narrow crystal size distribution of the zeolitic material without contributing to the pore structure of the material, i.e. without causing the crystalline material having mesopores in addition to micropores.

Most importantly, it was found that it is not necessary to adjust the polymer to the desired crystal size and size distribution as taught in the prior art, especially in the documents relating to the synthesis of zeolitic materials in solid-state matrices and in the abstract "Synthesis of Uniformed Nanosized Zeolites from Reaction Gels inside Confined Polymer Spheroidal Voids" published on the occasion of the 14th International Zeolite Conference, South Africa, Apr. 23 to 25, 2004. It was surprisingly found that by variation of the concentration of a specific polymer in the synthesis gel, the desired crystal sizes with the narrow size distribution can be obtained.

Thus, a method is provided for controlling the size of nanosized crystals of a zeolitic material by solely altering the concentration of a polymer present in the mixture wherefrom crystals are obtained.

Therefore, the present invention also relates to a method for controlling the size of the crystals of a zeolitic material in a process for preparing said zeolitic material, said process comprising (i) preparing a mixture comprising the at least one silicon containing precursor compound from which the zeolitic framework is formed, at least one pore forming agent, and at least one polymer which has an essentially spheroidal geometry in the mixture;

(ii) crystallizing the zeolitic material from the mixture obtained in (i) to obtain the crystallized zeolitic material in its mother liquor, wherein at least 80% of the crystals have a size in the range of from $(x-\Delta x)$ nm to $(x+\Delta x)$ nm, wherein $\Delta x$ is in the range of from 0 to 25, and wherein, for a given zeolitic material, x has a value in the range of from 50 to 500, the size of the crystals determined via TEM, said method for controlling the size of the crystals being characterized in that the higher the value of x to be obtained, the lower the concentration of the polymer in the mixture according to (i) has to be chosen.

Moreover, the present invention relates to this method, wherein the polymer is a polyacrylate which contains building blocks derived from dimethylaminomethyl acrylate quaternized with methyl methacrylate, butanediol diacrylate and/or diethyl sulfate, the concentration of the polyacrylate to obtain a zeolitic material with x in the range of from 50 to 100 being in the range of from 5 to 1.5 g (polymer)/g (silicon contained in mixture (i)), the silicon calculated as $SiO_2$, the concentration of the polyacrylate to obtain a zeolitic material with x being in the range of from 400 to 500 being in the range of from 0.15 to 0.10 g (polymer)/g (silicon contained in mixture (i)), the silicon calculated as $SiO_2$.

Most preferably, this above-described method is applicable to zeolite ZSM-5.

According to another aspect, the present invention provides a zeolitic material, obtainable by the process as described above.

The zeolitic material obtainable according to the invention can generally be used in all processes or operations in which the properties of a zeolite material are desired. Very particularly preferably, the zeolitic material is used as the catalyst in chemical reactions.

The present invention accordingly relates to the use of a zeolitic material as described above, or of a zeolitic material obtainable by a process as described above, as a catalyst.

Precisely in the area of catalysts, it is often desired by users to employ not the crystalline, catalytically active material per se but the material which is present in moldings. These moldings are required in many industrial processes in order, for example, to be able to operate chemical reactions expediently in, for example, tubular reactors or tube-bundle reactors by, inter alia, the fixed-bed procedure.

The present invention accordingly also relates to a molding containing a zeolitic material as described above.

In general, the molding may comprise all conceivable compounds in addition to the zeolitic material, provided that it is ensured that the resulting molding is suitable for the desired application.

In the context of the present invention, it is preferable to use at least one suitable binder material in the production of the molding. In this preferred embodiment, it is furthermore preferable to prepare a mixture of zeolitic material and the at least one binder.

Accordingly, the present invention also relates to a process for the production of a molding, containing a zeolitic material as described above, comprising the step (I) preparation of a mixture containing a zeolitic material as described above, or a zeolitic material obtainable by a process as described above, and at least one binder material.

Suitable binders are in general all compounds which impart adhesion and/or cohesion between the particles of the zeolitic material which are to be bound, which adhesion and cohesion are over and above the physisorption which may be present without a binder. Examples of such binders are metal oxides, such as $SiO_2$, $Al_2O_3$, $TiO_2$, $ZrO_2$ or $MgO$ or clays or mixtures of two or more of these compounds.

Al$_2$O$_3$ binders are in particular clay minerals and naturally occurring or synthetic aluminas, for example alpha-, beta-, gamma-, delta-, eta-, kappa-, chi- or theta-alumina and the inorganic or organometallic precursor compounds thereof, for example gibbsite, bayerite, boehmite, pseudoboehmite or trialkoxyaluminates, for example aluminum triisopropylate. Further preferred binders are amphiphilic compounds having a polar and a nonpolar moiety, and graphite. Further binders are, for example, clays, such as montmorillonites, kaolins, bentonites, halloysites, dickites, nacrites or anaxites.

These binders may be used as such. It is also possible in the context of the present invention to use compounds from which the binder is formed in at least one further step in the production of the moldings. Examples of such binder precursors are tetraalkoxysilanes, tetraalkoxytitanates, tetraalkoxyzirconates or a mixture of two or more different tetraalkoxysilanes or a mixture of two or more different tetraalkoytitanates or a mixture of two or more different tetraalkoxyzirconates or a mixture of at least one tetraalkoxysilane and at least one tetraalkoxytitanate or of at least one tetraalkoxysilane and at least one tetraalkoxyzirconate or of at least one tetraalkoxytitanate and at least one tetraalkoxyzirconate or a mixture of at least one tetraalkoxysilane and at least one tetraalkoxytitanate and at least one tetraalkoxyzirconate.

In the context of the present invention, binders which either completely or partly comprise SiO$_2$ or are a precursor of SiO$_2$ from which SiO$_2$ is formed in at least one further step in the production of the moldings are very particularly preferred. In this context, both colloidal silica and wet process silica and dry process silica can be used. These are very particularly preferably amorphous silica, the size of the silica particles being from 5 to 100 nm and the surface area of the silica particles being from 50 to 500 m$^2$/g.

Colloidal silica, preferably as an alkaline and/or ammoniacal solution, more preferably as an ammoniacal solution, is commercially available, inter alia, as Ludox®, Sytpn®, Nalco® or Snowtex®.

Wet process silica is commercially available, inter alia, as Hi-Sil®, Ultrasil®, Vulcasil®, Santocel®, Valron-Estersil®, Tokusil® or Nipsil®.

Dry process silica is commercially available, inter alia, as Aeeosil®, Reolosil®, Cab-O-Sil®, Fransil® or ArcSilica®.

Inter alia, an ammoniacal solution of colloidal silica is preferred in the context of the present invention.

Accordingly, the present invention also relates to a molding as described above, additionally containing SiO$_2$ as binder material.

The present invention also relates to a process as described above, the binder used according to (I) being an SiO$_2$-containing or -forming binder.

Accordingly, the present invention also relates to a process as described above, the binder being a colloidal silica.

The binders are preferably used in an amount which leads to the finally resulting moldings, whose binder content is up to 80, more preferably from 5 to 80, more preferably from 10 to 70, more preferably from 10 to 60, more preferably from 15 to 50, more preferably from 15 to 45, particularly preferably from 15 to 40, % by weight, based in each case on the total weight of the finally resulting molding.

The mixture of binder or precursor for a tinder and the zeolite material can be mixed with at least one further compound for further processing and for forming a plastic mass. Inter alia, pore formers are preferred here.

Pore formers which may be used in the novel process are all compounds which, with regard to the prepared molding, provide a certain pore size, a certain pore size distribution and/or a certain pore volume.

Preferably used pore formers in the novel process are polymers which are dispersible, suspendable or emulsifiable in water or in aqueous solvent mixtures. Preferred polymers here are polymeric vinyl compounds, for example polyalkylene oxides, such as polyethylene oxides, polystyrene, polyacrylates, polymethacrylates, polyolefins, polyamides and polyesters, carbohydrates, such as cellulose or cellulose derivatives, for example methylcellulose, or sugar or natural fibers. Further suitable pore formers are, for example, pulp or graphite.

If pore formers are used in the preparation of the mixture according to (i), the polymer content of the mixture according to (i) is preferably from 5 to 90, more preferably from 15 to 75, particularly preferably from 25 to 55, % by weight, based in each case on the amount of zeolite material in the mixture according to (i).

If it is desirable for the pore size distribution to be achieved, a mixture of two or more pore formers may also be used.

In a specific embodiment of the novel process, as described below, the pore formers are removed in a step (V) by calcination to give the porous molding. According to one embodiment of the novel process, moldings which have pores in the region of at least 0.6, preferably from 0.6 to 0.8, particularly preferably from more than 0.6 to 0.8, ml/g, determined according to DIN 66134, can be obtained.

The specific surface area of the novel molding, determined according to DIN 66131, is in general at least 350, preferably at least 400, particularly preferably at least 425, m$^2$/g. For example, the specific surface area may be from 350 to 500 or from 400 to 500 or from 425 to 500 m$^2$/g.

Accordingly, the present invention also relates to a molding as described above, having a specific surface area of at least 350 m$^2$/g, comprising pores having a pore volume of at least 0.6 ml/g.

In the preparation of the mixture according to (I), at least one pasting agent is added in a likewise preferred embodiment of the novel process.

Pasting agents which may be used are all compounds suitable for this purpose. These are preferably organic, in particular hydrophilic, polymers, for example cellulose, cellulose derivatives, such as methylcellulose, starch, such as potato starch, wallpaper paste, polyacrylates, polymethacrylates, polyvinyl alcohol, polyvinylpyrrolidone, polyisobutene or polytetrahydrofuran.

In particular, compounds which also act as pore formers can accordingly be used as pasting agents.

In a particularly preferred embodiment of the novel process, as described below, these pasting agents are removed in a step (V) by calcination to give the porous molding.

According to a further embodiment of the present invention, at least one acidic additive is introduced during the preparation of the mixture according to (I). Organic acidic compounds can be removed by calcination in the preferred step (V), as described below, are very particularly preferred. Carboxylic acids, for example formic acid, oxalic acid and/or citric acid, are particularly preferred. It is also possible to use two or more of these acidic compounds.

The order of addition of the components of the mixture according to (I) which contains the zeolite material is not critical. It is possible both first to add the at least one binder, then the at least one pore former, the at least one acidic compound and finally the at least one pasting agent and to interchange the sequence with regard to the at least one binder, the at least one pore former, the at least one acidic compound and the at least one pasting agent.

After the addition of the binder to the zeolite-containing solid, to which, if required, at least one of the compounds described above had already been added, the mixture according to (I) is as a rule homogenized for from 10 to 180 minutes. Inter alia, kneaders, edge mills or extruders are particularly preferably used for the homogenization. The mixture is preferably kneaded. On an industrial scale, treatment in an edge mill is preferred for homogenization.

Accordingly, the present invention also relates to a process as described above, comprising the steps (I) preparation of a mixture containing a zeolite material as described above, or a zeolite material obtainable by a process as described above, and at least one binder material;

(II) kneading of the mixture.

In the homogenization, as a rule temperatures of from about 10° C. to the boiling point of the pasting agent and atmospheric or slightly superatmospheric pressure are employed. If required, at least one of the compounds described above can then be added. The mixture thus obtained is homogenized, preferably kneaded, until an extrudable plastic mass has formed.

The homogenized mixture is molded according to a more preferred embodiment of the present invention.

In the context of the present invention, preferred shaping methods are those in which the molding is effected by extrusion in conventional extruders, for example to give extrudates having a diameter of, preferably, from 1 to 10 mm, particularly preferably from 2 to 5 mm. Such extrusion apparatuses are described, for example, in Ullmann's Enzyldopädie der Technischen Chemie, 4th Edition, Vol. 2, page 295 et seq., 1972. In addition to the use of an extruder, a ram extruder may likewise preferably be used for the molding.

In principle, however, all known and/or suitable kneading and molding apparatuses and methods can be used for the shaping. Examples of these include:

(a) bricketting, i.e. mechanical pressing with or without addition of additional binder material;

(b) pelleting, i.e. compacting by circular and/or rotational movements;

(c) sintering, i.e. the material to be molded is subjected to a thermal treatment.

For example, the shaping can be selected from the following group, the combination of at least two of these methods being explicitly included: bricketting by means of a ram press, roll press or ring-roll press, bricketting without binder; pelleting, melting, spinning techniques, deposition, foaming, spry-drying; combustion in a shaft furnace, convection furnace, travelling grate, rotary kiln, edge mill.

The compacting may take place at ambient pressure or at superatmospheric pressure, for example at from 1 to several hundred bar. Furthermore, the compacting may take place at ambient temperature or at a temperature higher than the ambient temperature, for example at from 20 to 300° C. It drying and/or combustion are part of the shaping step, temperatures of up to 1500° C. are conceivable. Finally, the compacting may take place in the ambient atmosphere or in a controlled atmosphere. Controlled atmospheres are, for example, inert gas atmospheres or reducing and/or oxidizing atmospheres.

Accordingly, the present invention also relates to a process for the production of a molding as described above, comprising the steps (I) preparation of a mixture containing a zeolite material as described above, or a zeolite material by a process as described above, and at least one binder material;

(II) kneading of the mixture;

(III) molding of the kneaded mixture to give at least one molding.

The shape of the moldings produced according to the invention can be chosen as desired. In particular, inter alia spheres, oval shapes, cylinders or tablets are possible.

In the context of the present invention, the molding is particularly preferably carried out by extrusion of the kneaded mixture obtained according to (II), more preferably substantially cylindrical extrudates having a diameter of from 1 to 20 mm, preferably from 2 to 10 mm, being obtained as extrudates.

In the context of the present invention, step (III) is preferably followed by at least one drying step. This at least one drying step is effected at in general from 80 to 160° C., preferably from 90 to 145° C., particularly preferably from 100 to 130° C., the duration of drying generally being 6 hours or more, for example from 6 to 24 hours. However, depending on the moisture content of the material to be dried, shorter drying times, for example about 1, 2, 3, 4 or 5 hours, are also possible.

Before and/or after the drying step, the preferably obtained extrudate can, for example, be comminuted. Preferably, granules or chips having a particle diameter of from 0.1 to 5 mm, in particular from 0.5 to 2 mm, are obtained.

Accordingly, the present invention also relates to a process for the production of a molding as described above, comprising the steps (I) preparation of a mixture containing a zeolite material as described above, or a zeolite material obtainable by a process as described above, and at least one binder material;

(II) kneading of the mixture;

(III) molding of the kneaded mixture to give at least one molding;

(IV) drying of the at least one molding.

In the context of the present invention, step (IV) is preferably followed by at least one calcination step. The calcination is carried out at in general from 350 to 750° C., preferably from 450 to 600° C.

The calcination can be effected under any suitable gas atmosphere, air and/or lean air being preferred. Furthermore, the calcination is preferably carried out in a muffle furnace, a rotary kin and/or a belt calcination furnace, the duration of calcination generally being 1 hour or more, for example from 1 to 24 or from 3 to 12 hours. Accordingly, it is possible in the novel process, for example, to calcine the moldings once, twice or more often for in each case at least one hour, for example in each case from 3 to 12 hours, it being possible for the temperatures during the calcination step to remain the same or to be changed continuously or discontinuously. If calcination is effected twice or more often, the calcination temperatures in the individual steps may be different or identical.

Accordingly, the present invention also relates to a process for the production of moldings as described above, comprising the steps (I) preparation of a mixture containing a zeolite material as described above, or a zeolite material obtainable by a process as described above, and at least one binder material;

(II) kneading of the mixture;
(III) molding of the kneaded mixture to give at least one molding;
(IV) drying of the at least one molding;
(V) calcination of the at least one dried molding.

After the calcination step, the calcined material can, for example, be comminuted. Preferably, granules or chips having a particle diameter of from 0.1 to 5 mm, in particular from 0.5 to 2 mm, are obtained.

Before and/or after the drying and/or before and/or after the calcination, the at least one molding can be treated with a concentrated or dilute Broenstedt acid or with a mixture of two or more Broenstedt acids. Suitable acids are, for example, hydrochloric acid, sulfuric acid, phosphoric acid, nitric acid or carboxylic acids, dicarboxylic acids or oligo- or polycarboxylic acids, such as nitrilotriacetic acid, sulfosalicylic acid or ethylenediaminotetraacetic acid.

Preferably, this at least one treatment with at least one Broenstedt acid is followed by at least one drying step and/or at least one calcination step, which in each case is carried out under the conditions described above.

According to a further preferred embodiment of the novel process, the catalyst extrudates can be subjected to a steam treatment for better hardening, after which once again preferably drying is effected at least once and/or calcination is effected at least once. For example, after at least one drying step and at least one subsequent calcination step, the calcined molding is subjected to steam treatment and then once again dried at least once and/or calcined at least once.

The moldings obtained according to the invention have hardnesses which are in general from 2 to 15 N, preferably from 5 to 15 N, particularly preferably from 10 to 15 N.

The present invention accordingly also relates to a molding as described above, having a cutting hardness of from 2 to 15 N.

In the present invention, the hardness described above was determined on an apparatus from Zwick, type BZ2.5/TS1S with a preliminary force of 0.5 N, a feed velocity under the preliminary force of 10 mm/min and a subsequent test velocity of 1.6 mm/min. The apparatus had a fixed turntable and a freely movable punch with built-in blade of 0.3 mm thickness. The movable punch with the blade was connected to a load cell for force pick-up and, during the measurement, moved toward the fixed turntable on which the catalyst molding to be investigated was present. The test apparatus was controlled by means of a computer which registered and evaluated the measured results. The value obtained id the mean value of the measurements for 10 catalyst moldings in each case. The catalyst moldings had a cylindrical geometry, their average length corresponding to about twice to three times the diameter, and were loaded with the blade of 0.3 mm thickness with increasing force until the molding had been cut through. The blade was applied to the molding perpendicularly to the longitudinal axis of the molding. The force required for this purpose is the cutting hardness (unit N).

The at least one molding according td the invention and/or the molding produced according to the invention can generally be used in all processes or operations in which the properties of the molding and in particular of the novel zeolite material contained in the molding or a zeolite material prepared according to the invention are desired. Very particularly preferably, the at least one molding according to the invention or the molding produced according to the invention is used as a catalyst in chemical reactions.

The present invention accordingly relates to the use of a molding as described above, or of a molding obtainable by a process as described above, as the catalyst.

As possible technical areas where the zeolitic material of the present invention, being ZSM-5, as crystalline material or as molding comprising the zeolitic material, the preparation of epsilon-caprolactam from cyclohexanone oxime and in the preparation of N-vinylpyrrolidone from N-hydroxyethylpyrrolidone are to be mentioned by way of example. The use of the ZSM-5 zeolite material and/or of the molding in the selective synthesis of triethylenediamine (TEDA), catalytic cracking such as cracking of cumene and 1,3,5-triisopropyl benzene are, among others, very particularly preferred.

As possible technical areas where the zeolitic material of the present invention, being TS-1, as crystalline material or as molding comprising the zeolitic material, the catalytic conversion of organic molecules. Reactions of this type are, for example, oxidations, the epoxidation of olefins, e.g. the preparation of propylene oxide from propylene and $H_2O_2$ the hydroxylation of aromatics, e.g. the preparation of hydroquinone from phenol and $H_2O_2$ or the conversion of toluene into cresol, the conversion of alkanes into alcohols, aldehydes and acids, isomerization, reactions, for example the conversion of epoxides into aldehydes. The zeolitic material discussed in detail above being TS-1 is particularly suitable for the epoxidation of olefins, preferably those of 2 to 8 carbon atoms, particularly preferably ethylene, propylene or butene, and in particular of propene to the corresponding olefin oxides. Accordingly, the present invention relates in particular to the use of the zeolitic material being TS-1, as crystalline material and/or as molding described herein for the preparation of propylene oxide starting from propylene and hydrogen peroxide.

In the following, preferred processes of the present invention are listed resulting from the following embodiments 1 to 12 including the combinations of these embodiments as explicitly given:

1. A process for preparing a zeolitic material, comprising
   (i) preparing a mixture comprising the at least one silicon containing precursor compound from which the zeolitic framework is formed, at least one pore forming agent, and at least one polymer which has an essentially spheroidal geometry in the mixture;
   (ii) crystallizing the zeolitic material from the mixture obtained in (i) to obtain the crystallized zeolitic material in its mother liquor,
   wherein the size of the crystals is controlled by the concentration of the polymer present in the mixture according to (i).
2. The process as described in embodiment 1, wherein the at least one polymer has a mean diameter in the range of from 50 to 500 nm.
3. The process as described in embodiment 1 or 2, wherein the polymer contains building blocks derived from dimethylaminomethyl acrylate, quaternized with diethyl sulfate, methyl methacrylate, and/or butanediol diacrylate.
4. The process as described in any of embodiments 1 to 3, wherein the concentration of the polymer in the mixture obtained from (i) is in the range of from 0.01 to 5 g (polymer)/g (silicon contained in mixture (i)), the silicon calculated as $SiO_2$.
5. The process as described in any of embodiments 1 to 4, wherein the mixture in (i) additionally comprises water and at least one base.
6. The process as described in any of embodiments 1 to 5, wherein crystallizing the zeolitic material from the mixture obtained in (i) according to (ii) is carried out at a temperature in the range of from 100 to 180° C.
7. The process as described in any of embodiments 1 to 6, the process additionally comprising
    (iii) separating the crystals obtained from (ii) from the mother liquor;
    (iv) drying the separated crystals;
    (v) calcining the dried crystals.
8. The process as described in any of embodiments 1 to 7, wherein at least 80% of the crystals have a size in the range of from $(x-\Delta x)$ nm to $(x+\Delta x)$ nm, wherein $\Delta x$ is in the range of from 0 to 25, and wherein, for a given zeolitic material, x has a value in the range of from 50 to 500, the size of the crystals determined via TEM.
9. The process as described in embodiment 8, wherein at least 90% of the crystals have a size in the range of from $(x-\Delta x)$ nm to $(x+\Delta x)$ nm, and wherein $\Delta x$ is in the range of from 0 to 20.
10. The process as described in any of embodiments 1 to 9, the zeolitic material having a BET surface, determined via DIN 66131, in the range of from 300 to 700 m²/g.
11. The process as described in any of embodiments 1 to 10, the zeolitic material having the following formula $$N_{a+b}Al_aM_bSiO_2 \quad (I)$$

with a being in the range of from 0.00 to 1.00, b being in the range of from 0.00 to 0.05, N being selected from the group consisting of alkali metal ions, alkaline earth metal ions, the ammonium ion and a mixture of two or more thereof, and M being selected from the group consisting of $Fe^{3+}$, $B^{3+}$, $Ti^{4+}$, $V^{4+}$, $Zn^{2+}$, $Ge^{4+}$ and mixture of two or more thereof,
wherein a and b are chosen such that the oxide according to formula (I) is electrically neutral.
12. The process as described in any of embodiments 1 to 11, wherein the zeolitic material is selected from the group consisting of zeolite ZSM-5, zeolite TS-1, and zeolite beta.
13. Use of an essentially spheroidal polymer as structure directing agent in the synthesis of nanosized zeolitic material, preferably as agent directing the size of the crystals of the zeolitic material having a narrow size distribution.
14. The use as described in embodiment 13, wherein at least 80% of the crystals have a size in the range of from $(x-\Delta x)$ nm to $(x+\Delta x)$ nm, wherein $\Delta x$ is in the range of from 0 to 25, and wherein, for a given zeolitic material, x has a value in the range of from 50 to 500, the size of the crystals determined via TEM, the polymer containing, preferably consisting of building blocks derived from dimethylaminomethyl acrylate, quaternized with diethyl sulfate, methyl methacrylate, and/or butanediol diacrylate.
15. The use described in embodiments 13 or 15, the polymer having a mean diameter in the range of from 50 to 500 nm.

DESCRIPTION OF THE FIGURES

In FIGS. 6 and 7, the interesting fact is to be observed that although the molar ratio of Si/Ti in nanosized TS-1 is larder than that in conventional TS-1, catalytic activity in nanosized TS-1 is much higher than that in conventional TS-1, indicating that nanosized TS-1 is more active than conventional TS-1.

FIG. 9 shows SEM images of calcined nanosized zeolites ZSM-5 according to example 2.2:
    (A) ZSM-5 (300 nm)
    (B) ZSM-5 (200 nm)
    (C) ZSM-5 (100 nm)
    (D) ZSM-5 (80 nm)

The inventive process is illustrated by the following examples.

EXAMPLES

Example 1

TS-1

Example 1.1

Synthesis of Nanosized Zeolite TS-1 According to the Invention

The titanosilicate gels were prepared by mixing 5 mL of TPAOH (tetrapropylammonium hydroxide) aqueous solution (25%) with 5 mL of $H_2O$, followed by addition of 0.3 mL of $Ti(OC_4H_9)_4$ and 5 mL of TEOS (tetraethoxysilane) under stirring ($TiO_2/SiO_2/TPAOH/C_2H_5OH/H_2O$ molar ratios of 1.0/30/8/120/375). The mixture was then aged at 140° C. for 3 hours. 5 mL of polymer spheroidal dispersion ( ) was mixed with 5 mL of titanosilicate gels obtained in step 1. The mixture was stirred at room temperature for 4 h, then transferred into ad autoclave for additional reaction at 140° C. for 96 h. The final product prepared from the titanosilicate gel was collected by filtration, washed several times, dried in air, and calcined at 500° C. for 4 hours.

The Si/Ti ratio of nanosized TS-1 is 85, determined via ICP (Perkin-Elmer 3300 DV).

The polymer dispersion employed had the following characteristics:

Monomers: 90% by weight of methyl methacrylate 5% by weight of dimethylaminoethylmethacryl amide, quaternized with diethyl sulfate) 5% by weight of butanediol diacrylate Others: 10.0% by weight of Lipamin OK (cationic emulsifier, BASF)

Solids content: 50% by weight

Particle size: 140 to 150 nm, determined on a Beckmann Coulter N4 Plus submicron particle sizer at T=23° C. and a run time of 3.0 microseconds, further using water as diluent.

Example 1.2

Synthesis of Nanosized Zeolite TS-1 According to the Prior Art

The titanosilicate gel was prepared by mixing 5 mL of TPAOH aqueous solution (25%) with 5 mL of $H_2O$, followed by addition of 0.3 mL of $Ti(OC_4H_9)_4$ and 5 mL of TEOS under stirring ($TiO_2/SiO_2/TPAOH/C_2H_5OH/H_2O$ molar ratios of 1.0/30/8/120/375). The mixture is then aged at 140° C. for 5 days.

Si/Ti ratio of conventional TS-1 is 40, determined via ICP (Perkin-Elmer 3300 DV).

Example 1.3

Figure 1:
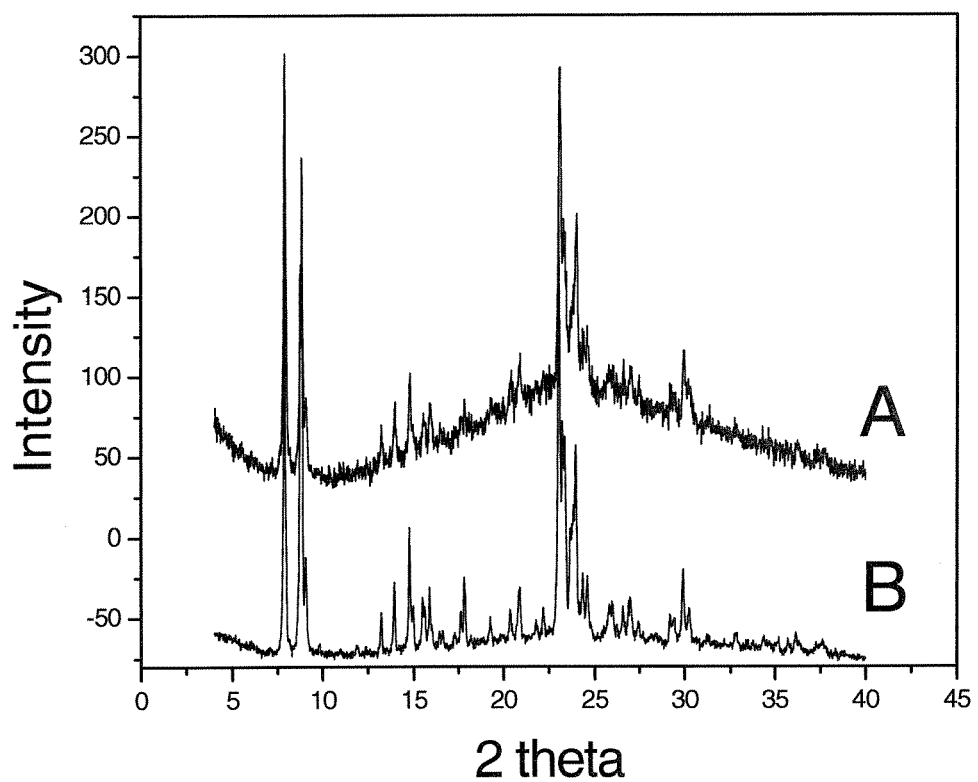
FIG. 1 shows XRD patterns of the zeolitic material obtained by the inventive process according to example 1.1 (A) and conventionally prepared zeolitic material obtained according to U.S. Pat. No. 4,410,501 (conventional TS-1 zeolites with crystal size of several micrometers, (B)). XRD patterns were performed on Siemens D5005 with Cu K alpha radiation for phase identification, operated at 40 kV and 55 mA. Obviously, the peaks of the inventive material (A) are much wider than those of conventional TS-1 zeolite, suggesting that crystal size of TS-1 zeolite according to the invention is much smaller.
Figure 2:
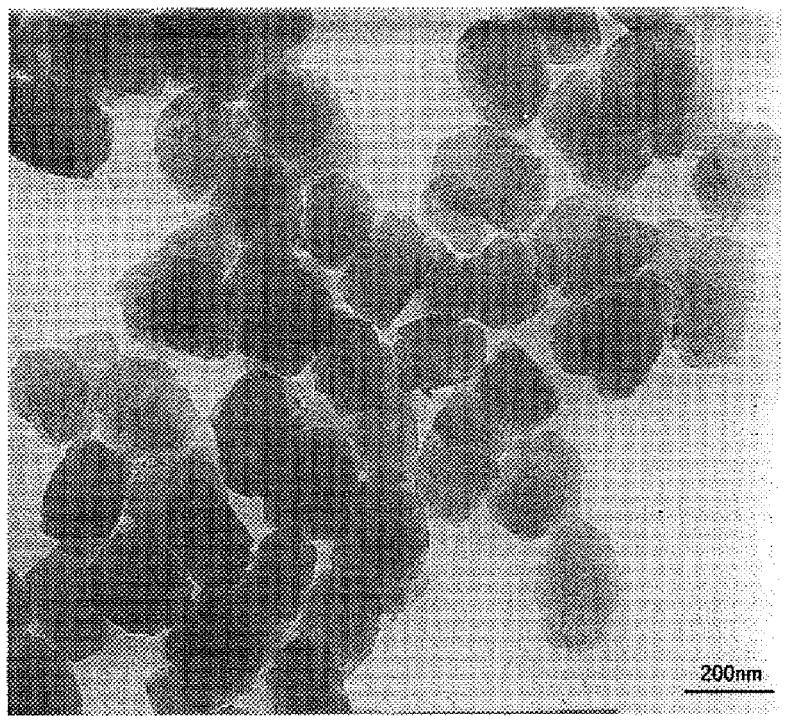
FIG. 2 shows a field emission-scanning electron microscopy (FE-SEM, JSM-5400F) image of TS-1 material according to example 1.1. This image shows the very uniform crystal size of the zeolitic material obtained according to the inventive process according to example 1.1 and thus the very narrow particle size distribution.
Figure 3:
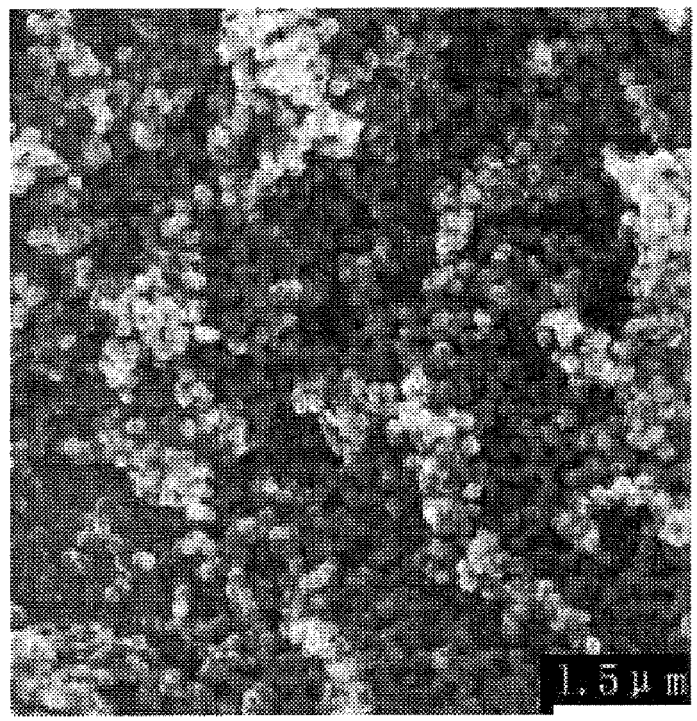
FIG. 3 shows an electron microscopy (TEM, JEOL-2010, 200 keV) image of nanosized TS-1 material according to example 1.1. This image, too, shows the very uniform crystal size of the zeolitic material obtained according to the inventive process according to example 1.1 and thus the very narrow particle size distribution.
Figure 4:
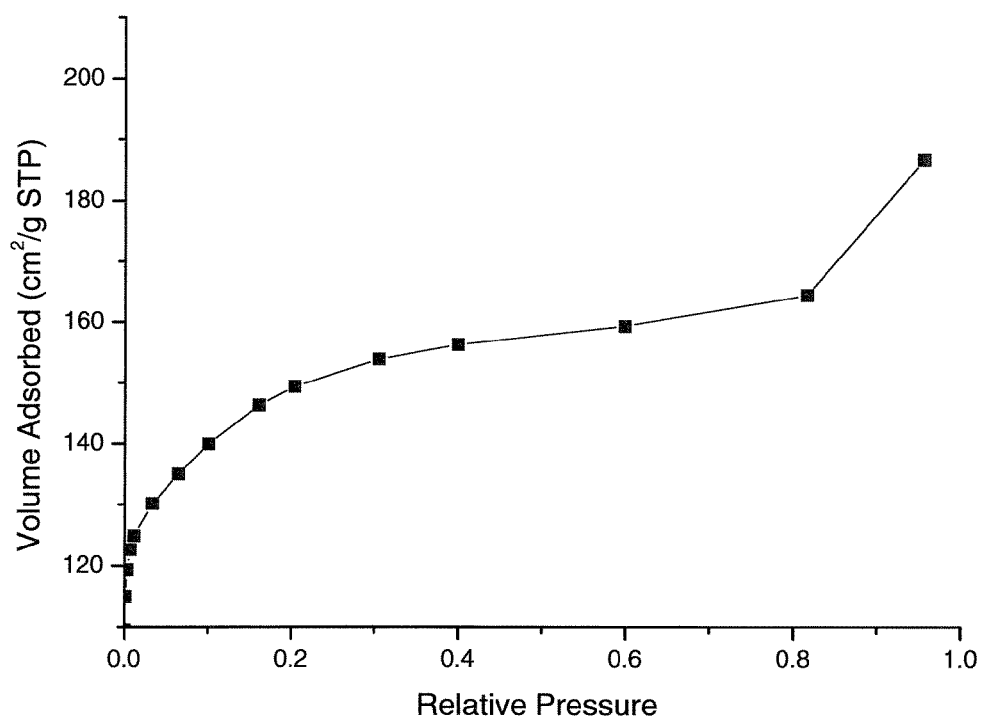
FIG. 4 shows $N_2$ adsorption-desorption isotherms of nanosized TS-1 zeolite according to example 1.1 (ASAP 2010M porosimeter measured at 77 K). The plot exhibits a steep rise followed by flat curve at low partial pressures, indicating complete filling of the micropores with $N_2$. Additionally, the sample also show quite a narrow hysteretic uptakes at high partial pressures, corresponding to mesopores formed by aggregation of nanosized TS-1 zeolites. Notably, the external surface area of the samples are larger than 170 m²/g, and accounting for approximately half the total surface area.
Figure 5:
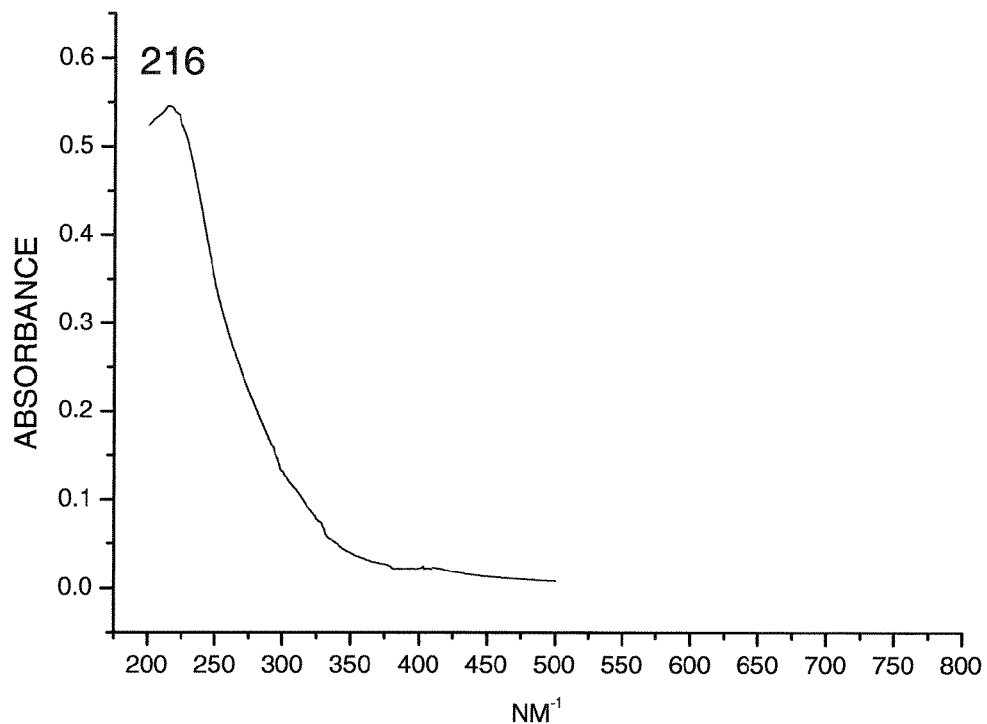
FIG. 5 shows an UV-Vis spectrum of nanosized TS-1 according to example 1.1 (PE Lambda 20 with an internal standard sample of $BaSO_4$). The strong band at 216 nm is very similar to that of conventional TS-1 zeolites, assigned to the titanium species in $T_d$ coordination (see U.S. Pat. No. 4,410,501).
Figure 6:
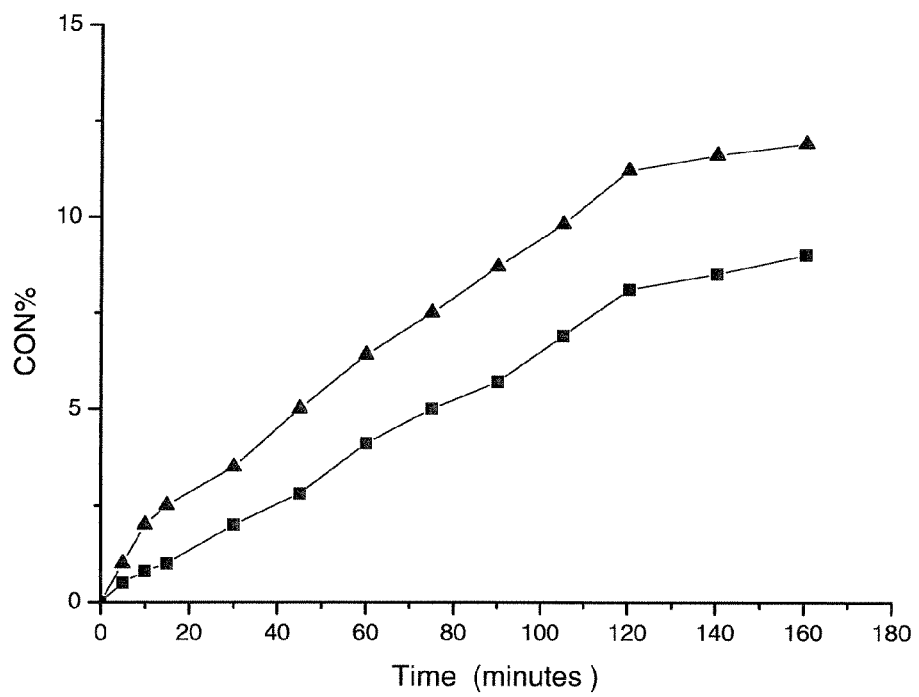
FIG. 6 shows the catalytic activity in phenol hydroxylation by hydrogen peroxide over 0.02 g of (▲) nanosized TS-1 according to example 1.1 and (■) conventional TS-1 catalysts (see example 1.3).
Figure 7:
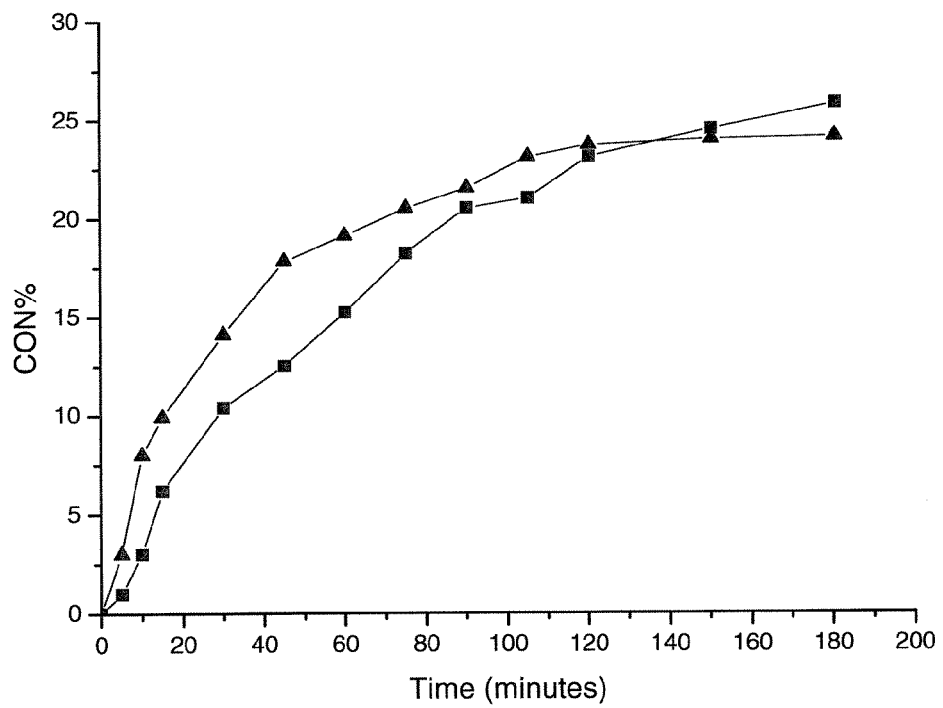
FIG. 7 shows the catalytic activity in phenol hydroxylation by hydrogen peroxide over 0.05 g of (▲) nanosized TS-1 according to example 1.1 and (■) conventional TS-1 catalysts.
Figure 8:
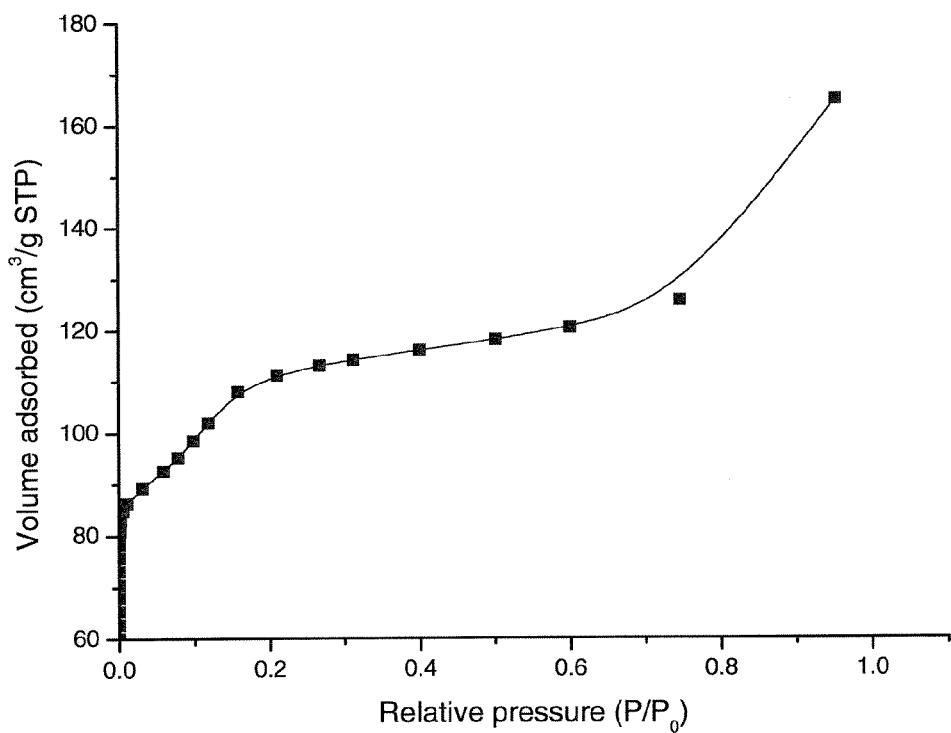
FIG. 8 shows $N_2$ adsorption-desorption isotherms of nanosized ZSM-5 zeolite according to example 2.1 (ASAP 2010 M porosimeter measured at 77 K). The plots exhibit a steep rise followed by flat curves at low partial pressures and quite narrow hysteretic uptakes at high partial pressures. Also, it is found that the external surface area of the samples are larger than 160 m²/g, and total surface area is near 500 m²/g.

Test of Catalytic Activities of Zeolites TS-1 According to Example 1.1 and According to Example 1.2; Conversion of Phenol by Reaction with Hydrogen Peroxide Reaction conditions: water was used as a solvent, reaction temperature at 80° C., phenol/$H_2O_2$=3/1 (molar ratio), reaction time 4 h, 0.02 g catalyst and 0.05 g catalyst were employed for different runs, in each case TS-1 catalyst according to the invention and conventional TS-1 being compared. The products found were catechol, hydroquinone, and benzoquinone. The product of tar is not included. Hydrogen peroxide was used as 30 wt.-% aqueous solution (see FIGS. 6 and 7).

Example 2

ZSM-5

Example 2.1

Synthesis of Nanosized Zeolite ZSM-5 According to the Invention

The aluminosilicate gel was prepared by mixing 5 mL of TPAOH aqueous solution (25%) with 10 mL of $H_2O$, followed by addition of 0.3 g of $Al_2(SO_4)_3 \cdot 18H_2O$ and 5 mL of TEOS under stirring ($Al_2O_3/SiO_2/TPAOH/C_2H_5OH/H_2O$ molar ratios of 1.0/30/8/120/750). The mixture was then aged at 140° C. for 3 hours. 5 mL of polymer spheroidal dispersion was mixed with 5 mL of aluminosilicate gels obtained in step 1. The mixture was stirred at room temperature for 4 h, then transferred into an autoclave for additional reaction at 140° C. for 96 h. (3) The final product prepared from the aluminosilicate gels was collected by filtration, washed several times, dried in air, and calcined at 500° C. for 4 hours.

The material obtained had a surface area of 495 $m^2/g$ and a Si/Al ratio of 62, determined by ICP (Perkin-Elmer 3300 DV).

X-ray diffraction patterns of samples of example 2.2 showed characteristic peaks associated with ZSM-5 zeolite. Their peaks turned out to be much wider than those of conventional ZSM-5 zeolite, suggesting that crystal size of ZSM-5 zeolite according to the present invention were much smaller (data not shown).

Both SEM and TEM images of the samples of example 2.2 showed that the crystal size was about 200 nm, and the materials were very uniform indicating a narrow crystal size, distribution (data not shown).

The polymer dispersion employed had the following characteristics:

Monomers: 90% by weight of methyl methacrylate 5% by weight of dimethylaminoethylmethacryl amide, quaternized with diethyl sulfate) 5% by weight of butanediol diacrylate Others: 10.0% by weight of Lipamin OK (cationic emulsifier, BASF)

Solids content: 50% by weight

Particle size: 140 to 150 nm, determined on a Beckmann Coulter N4 Plus submicron particle sizer at T=23° C. and a run time of 3.0 microseconds, further using water as diluent.

Example 2.2

Synthesis of Nanosized Zeolite ZSM-5 According to the Invention; Control of the Crystal Size by Varying the Concentration of the Polymer The aluminosilicate gels were prepared by mixing 5 mL of TPAOH aqueous solution (25%) with 5 mL of $H_2O$, followed by addition of 0.3 g of $Al_2(SO_4)_3 \cdot 18 H_2O$ and 5 mL of TEOS under stirring ($Al_2O_3/SiO_2/TPAOH/C_2H_5OH/H_2O$ molar ratios of 1.0/30/8/120/1500). The mixture is then aged at 140° C. for 3 hours. 5 mL emulsion of spheroidal polymer (solid containing 1.5 g, 3 g, 6 g, and 7.5 g of spheroidal polymer acrylate solid) was mixed with 5 mL of aluminosilicate gels (containing 60 mmol $SiO_2$). The mixture was stirred at room temperature for 4 h, then transferred into an autoclave for additional reaction at 140° C. for 96 h. The final product prepared from the aluminosilicate gels was collected by centrifugation, washed with pure water dried, and named ZSM-5(300 nm), ZSM-5(200 nm), ZSM-5(100 nm), and ZSM-5(80 nm), respectively (see FIG. 9). The range of pH value of the synthesis was from 10–13.

Example 2.3

Conventional Synthesis of Zeolite ZSM-5

The aluminosilicate gel was prepared by mixing 5 mL of TPAOH aqueous solution (25%) with 5 mL of $H_2O$, followed by addition of 0.3 g of $Al_2(SO_4)_3 18H_2O$ and 5 mL of TEOS under stirring ($TiO_2/SiO_2/TPAOH/C_2H_5OH/H_2O$ molar ratios of 1.0/30/8/120/1500). The mixture was then aged at 140° C. for 5 hours.

The material obtained had a surface area of 350 $m^2/g$ and a Si/Al ratio of 35, determined by ICP (Perkin-Elmer 3300 DV).

Example 2.4

Test of Catalytic Activities of Zeolites ZSM-5 According to Example 2.1 and According to Example 2.3: Catalytic Cracking of Cumene and 1,3,5-triisopropyl Benzene (TIPB)

| Sample | Surface Area $m^2/g$ | Si/Al | Cumene conversion[a] % | TIPB conversion[a] % |
|---|---|---|---|---|
| Nanosized (ex. 2.1) | 495 | 62 | 61 | 53.9 |
| Conventional (ex. 2.2) | 350 | 35 | 40 | 4.4 |

[a]Analyses of the catalytic products were carried out using a GC-8A and GC-17A (Shimazu Co.) equipped with TCD and FID detectors.

Catalytic cracking of cumene and 1,3,5-tri-isopropylbenzene was carried out using the pulse method. The catalytic testing was performed according to the following standard conditions: mass of the catalyst was 0.051 g; reaction temperature was in the range of 250° C. (no thermal cracking); and the ratio of 1,3,5-tri-isopropylbenzene or cumene to the catalyst was 0.4 microL/0.051 g. Nitrogen was used as carrier gas at a flow rate of 0.92 mL/s.

Example 3

Zeolite Beta

Example 3.1

Synthesis of Nanosized Zeolite Beta According to the Invention

The aluminosilicate gel was prepared by adding NaOH (0.16 g), $NaAlO_2$ (0.20 g), and fumed silica (4.8 g; Tianjing Chemical Co.) into TEAOH (tetraethylammonium hydroxide) aqueous solution (25 mL, 20%) under stirring, then transferring the mixture into autoclave for aging 4 h at 140° C. (2) 5 mL of polymer spheroidal dispersion was mixed with 15 mL of aluminosilicate gels obtained in step 1. The mixture was stirred at room temperature for 4 h, and then transferred into autoclave for additional reaction at 140° C. for 24 h. The product was collected by filtration, dried in air, and calcined at 550° C. for 5 h to remove the templates and the polymer.

XRD patterns of the samples showed typical peaks associated with zeolite beta, and sample TEM images showed that these Zeolite exhibits a narrow size distribution near 200 nm (data not shown).

The polymer dispersion employed had the following characteristics:

Monomers: 90% by weight of methyl methacrylate 5% by weight of dimethylaminoethylmethacryl amide, quaternized with diethyl sulfate) 5% by weight of butanediol diacrylate Others: 10.0% by weight of Lipamin OK (cationic emulsifier, BASF)

Solids content: 50% by weight

Particle size: 140 to 150 nm, determined on a Beckmann Coulter N4 Plus submicron particle sizer at T=23° C. and a run time of 3.0 microseconds, further using water as diluent.

Example 3.2

Conventional Synthesis of Zeolite Beta

The aluminosilicate gel was prepared by adding NaOH (0.16 g), $NaAlO_2$ (0.20 g), and fumed silica (4.8 g; Tianjing Chemical Co.) into TEAOH aqueous solution (25 mL, 20%) under stirring, then transferring the mixture into autoclave for aging 2 days at 140° C. The product was collected by filtration, dried in air, and calcined at 550° C. for 5 h to remove the templates.

We claim:
1. A process for preparing a zeolitic material, comprising
  (i) preparing a mixture comprising the at least one silicon containing precursor compound from which the zeolitic framework is formed, at least one pore forming agent, and at least one polymer which has an essentially spheroidal geometry in the mixture;
  (ii) crystallizing the zeolitic material from the mixture obtained in (i) to obtain the crystallized zeolitic material in its mother liquor;
  (iii) separating the crystals obtained from (ii) from the mother liquor;
  (iv) drying the separated crystals;
  (v) calcining the dried crystals,
  wherein at least 80 % of the crystals have a size in the range of from (x−Δx) nm to (x+Δx) nm, wherein Δx is in the range of from 0 to 25, and wherein, for a given zeolitic material, x has a value in the range of from 50 to 500, the size of the crystals determined via TEM.

2. The process as claimed in claim 1, wherein the at least one polymer has a mean diameter in the range of from 50 to 500 nm.

3. The process as claimed in claim 1, wherein the polymer contains building blocks derived from dimethylaminomethyl acrylate, methyl methacrylate, and/or butanediol diacrylate, with diethyl sulfate.

4. The process as claimed in claim 1, wherein the concentration of the polymer in the mixture obtained from (i) is in the range of from 0.01 to 5 g (polymer)/g (silicon contained in mixture (i)), the silicon calculated as $SiO_2$.

5. The process as claimed in claim 1, wherein the mixture in (i) additionally comprises water and at least one base.

6. The process as claimed in claim 1, wherein crystallizing the zeolitic material from the mixture obtained in (i) according to (ii) is carried out at a temperature in the range of from 100 to 180° C.

7. The process as claimed in claim 1, wherein at least 90% of the crystals have a size in the range of from $(x-\Delta x)$ nm to $(x+\Delta x)$ nm, and wherein $\Delta x$ is in the range of from 0 to 20.

8. The process as claimed in claim 1, the zeolitic material having a BET surface, determined via DIN 66131, in the range of from 300 to 700 m²/g.

9. The process as claimed in claim 1, the zeolitic material having the following formula

$$N_{a+b}Al_aM_bSiO_2 \quad (I)$$

with a being in the range of from 0.00 to 1.00, b being in the range of from 0.00 to 0.05, N being selected from the group consisting of alkali metal ions, alkaline earth metal ions, the ammonium ion and a mixture of two or more thereof, and M being selected from the group consisting of $Fe^{3+}$, $B^{3+}$, $Ti^{4+}$, $V^{4+}$, $Zn^{2+}$, $Ge^{4+}$ and mixture of two or more thereof, wherein a and b are chosen such that the oxide according to formula (I) is electrically neutral.

10. The process as claimed in claim 1, wherein the zeolitic material is selected from the group consisting of zeolite ZSM-5, zeolite TS-1, and zeolite beta.

11. The process as claimed in claim 1, wherein the size of the crystals is controlled by the concentration of the polymer present in the mixture according to (i).

12. A method for controlling the size of the crystals of a zeolitic material in a process for preparing said zeolitic material, said process comprising (i) preparing a mixture comprising the at least one silicon containing precursor compound from which the zeolitic framework is formed, at least one pore forming agent, and at least one polymer which has an essentially spheroidal geometry in the mixture;

(ii) crystallizing the zeolitic material from the mixture obtained in (i) to obtain the crystallized zeolitic material in its mother liquor, wherein at least 80% of the crystals have a size in the range of from $(x-\Delta x)$ nm to $(x+\Delta x)$ nm, wherein $\Delta x$ is in the range of from 0 to 25, and wherein, for a given zeolitic material, x has a value in the range of from 50 to 500, the size of the crystals determined via TEM, said method for controlling the size of the crystals being characterized in that the higher the value of x to be obtained, the lower the concentration of the polymer in the mixture according to (i) has to be chosen.

13. The method as claimed in claim 12, wherein the polymer is a polyacrylate which contains building blocks derived from dimethylaminomethyl acrylate quaternized with methyl methacrylate, butanediol diacrylate and/or diethyl sulfate, the concentration of the polyacrylate to obtain a zeolitic material with x in the range of from 50 to 100 being in the range of from 5 to 1.5 g (polymer)/g (silicon contained in mixture (i)), the silicon calculated as $SiO_2$, the concentration of the polyacrylate to obtain a zeolitic material with x being in the range of from 400 to 500 being in the range of from 0.15 to 0.10 g (polymer)/g (silicon contained in mixture (i)), the silicon calculated as $SiO_2$.

14. The method as claimed in claim 13, wherein the zeolite is zeolite ZSM-5.

* * * * *